(12) United States Patent
Wei et al.

(10) Patent No.: US 11,108,549 B2
(45) Date of Patent: Aug. 31, 2021

(54) SERVICE PROCESSING METHOD AND APPARATUS

(71) Applicant: HUAWEI TECHNOLOGIES CO., LTD., Guangdong (CN)

(72) Inventors: Anni Wei, Shenzhen (CN); Chunshan Xiong, Shenzhen (CN); Jianjie You, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 330 days.

(21) Appl. No.: 16/212,630

(22) Filed: Dec. 6, 2018

(65) Prior Publication Data

US 2019/0116027 A1    Apr. 18, 2019

Related U.S. Application Data

(63) Continuation of application No. PCT/CN2016/085051, filed on Jun. 7, 2016.

(51) Int. Cl.
*H04L 9/08* (2006.01)
*H04L 29/06* (2006.01)
(Continued)

(52) U.S. Cl.
CPC .............. *H04L 9/083* (2013.01); *H04L 9/08* (2013.01); *H04L 9/14* (2013.01); *H04L 9/3247* (2013.01);
(Continued)

(58) Field of Classification Search
CPC ... H04L 9/083; H04L 9/08; H04L 9/14; H04L 9/3247; H04L 63/306; H04W 12/04031;
(Continued)

(56) References Cited

U.S. PATENT DOCUMENTS 6,760,752 B1 *   7/2004   Liu ..................... H04L 63/0428
6,948,060 B1     9/2005   Ramanathan
(Continued)

FOREIGN PATENT DOCUMENTS

CN   101515896 A   8/2009
CN   105429962 A   3/2016
WO   2010088813 A1 8/2010

OTHER PUBLICATIONS

Chen et al "SSL/TLS Secure Tunnel Gateway System Design and Implementation," pp. 258-261 (Year: 2007).*

*Primary Examiner* — Luu T Pham
*Assistant Examiner* — James J Wilcox
(74) *Attorney, Agent, or Firm* — Womble Bond Dickinson (US) LLP

(57) ABSTRACT

The present invention discloses a service processing method and apparatus, and relates to the communications field. The method includes: receiving trigger information sent by an intermediary device; and assisting, based on the trigger information, the intermediary device in negotiating with UE and a network server, to enable the intermediary device to obtain a first key, where the first key is used by the intermediary device to decrypt ciphertexts sent by the UE and the network server, the ciphertext is obtained after the UE or the network server encrypts service information by using a second key, and the first key is corresponding to the second key. The present invention resolves a problem that an intermediary device cannot provide service optimization for user equipment and a network server because the intermediary device cannot decrypt ciphertext, and achieves an effect of expanding a usage scope of service optimization.

13 Claims, 23 Drawing Sheets

301

A key management function entity receives trigger information sent by an intermediary device, where the trigger information is obtained after UE starts a procedure of setting up an encrypted connection to a network server

302

The key management function entity assists, based on the trigger information, the intermediary device in negotiating with the UE and the network server, to enable the intermediary device to obtain a first key, where the first key is used by the intermediary device to decrypt ciphertext sent by the UE and the network server, the ciphertext is obtained after the UE or the network server encrypts service information by using a second key, and the first key is corresponding to the second key

US 11,108,549 B2
Page 2

(51) Int. Cl.
| | |
|---|---|
| *H04W 12/03* | (2021.01) |
| *H04W 12/041* | (2021.01) |
| *H04W 12/55* | (2021.01) |
| *H04W 12/80* | (2021.01) |
| *H04W 12/0431* | (2021.01) |
| *H04W 12/0471* | (2021.01) |
| *H04L 9/14* | (2006.01) |
| *H04L 9/32* | (2006.01) |

(52) U.S. Cl.
CPC ........... *H04L 63/306* (2013.01); *H04W 12/03* (2021.01); *H04W 12/041* (2021.01); *H04W 12/0431* (2021.01); *H04W 12/0471* (2021.01); *H04W 12/55* (2021.01); *H04W 12/80* (2021.01)

(58) Field of Classification Search
CPC ....... H04W 12/0401; H04W 12/04071; H04W 12/00305; H04W 12/007; H04W 12/001
See application file for complete search history.

(56) References Cited

U.S. PATENT DOCUMENTS

| | | | |
|---|---|---|---|
| 7,055,027 B1 | 5/2006 | Gunter et al. | |
| 8,327,144 B2 * | 12/2012 | Liu | H04L 9/3213 |
| | | | 713/171 |
| 8,543,808 B2 * | 9/2013 | Ahmed | H04L 63/02 |
| | | | 713/153 |
| 8,739,243 B1 * | 5/2014 | Martini | H04L 63/0471 |
| | | | 726/1 |
| 8,843,750 B1 | 9/2014 | Sokolov | |
| 9,021,552 B2 * | 4/2015 | Zlatarev | H04L 63/0884 |
| | | | 726/2 |
| 9,538,376 B2 * | 1/2017 | Lehtinen | H04L 63/0281 |
| 2004/0128538 A1 * | 7/2004 | Gmuender | H04L 29/12594 |
| | | | 726/4 |
| 2004/0143735 A1 * | 7/2004 | Ferguson | H04W 12/06 |
| | | | 713/153 |
| 2007/0260871 A1 * | 11/2007 | Paya | H04L 63/0428 |
| | | | 713/151 |
| 2008/0052509 A1 * | 2/2008 | Ahmed | H04L 63/02 |
| | | | 713/156 |
| 2008/0235508 A1 * | 9/2008 | Ran | H04L 63/0428 |
| | | | 713/151 |
| 2010/0318799 A1 * | 12/2010 | Simon | H04L 9/32 |
| | | | 713/171 |
| 2014/0317397 A1 * | 10/2014 | Martini | H04L 63/0471 |
| | | | 713/153 |
| 2014/0337613 A1 * | 11/2014 | Martini | H04L 63/1441 |
| | | | 713/151 |
| 2015/0215286 A1 * | 7/2015 | Martini | H04L 63/0227 |
| | | | 726/12 |
| 2015/0333912 A1 * | 11/2015 | Graham-Cumming | H04L 9/12 |
| | | | 713/168 |
| 2015/0334595 A1 * | 11/2015 | Bosch | H04L 29/06 |
| | | | 370/235 |
| 2015/0381584 A1 * | 12/2015 | Martini | H04L 63/306 |
| | | | 713/155 |
| 2016/0142440 A1 | 5/2016 | Qian et al. | |
| 2016/0197890 A1 * | 7/2016 | Martini | H04L 63/168 |
| | | | 713/168 |
| 2017/0163624 A1 * | 6/2017 | Mattsson | H04L 63/20 |
| 2017/0317836 A1 * | 11/2017 | Wei | H04L 63/1408 |

* cited by examiner

CONT.
FROM
FIG. 6A-1

After the verification succeeds, the UE sends a first key to the key management function entity, and the first key is sent by the key management function entity to the intermediary device — 609

The key management function entity receives the first key sent by the UE after the UE has verified the signature of the network server by using the third key, and sends the first key to the intermediary device — 610

The UE encrypts service information by using a second key, to obtain ciphertext, and sends the ciphertext to the network server by using the intermediary device, where the second key is corresponding to the first key, and the first key is used by the intermediary device to decrypt the ciphertext — 611

The network server receives the ciphertext forwarded by the intermediary device — 612

The network server encrypts service information by using a second key, to obtain ciphertext, and sends the ciphertext to the UE by using the intermediary device, where the second key is corresponding to the first key, and the first key is used by the intermediary device to decrypt the ciphertext — 613

The UE receives the ciphertext forwarded by the intermediary device — 614

FIG. 6A-2

CONT.
FROM
FIG. 7A-1

709 — The UE decrypts the signature of the network server by using a third key, and determines that verification succeeds when obtaining the first confirm information, where the third key is obtained by the UE from the network server when the UE sets up a first encrypted connection, and the third key is corresponding to the fourth key 710 — After the verification succeeds, the UE sends a first key to the key management function entity, and the first key is sent by the key management function entity to the intermediary device 711 — The key management function entity receives the first key sent by the UE after the UE has verified the signature of the network server by using the third key, and sends the first key to the intermediary device 712 — The UE encrypts service information by using a second key, to obtain ciphertext, and sends the ciphertext to the network server by using the intermediary device, where the second key is corresponding to the first key, and the first key is used by the intermediary device to decrypt the ciphertext 713 — The network server receives the ciphertext forwarded by the intermediary device 714 — The network server encrypts service information by using a second key, to obtain ciphertext, and sends the ciphertext to the UE by using the intermediary device, where the second key is corresponding to the first key, and the first key is used by the intermediary device to decrypt the ciphertext 715 — The UE receives the ciphertext forwarded by the intermediary device

FIG. 7A-2

SERVICE PROCESSING METHOD AND APPARATUS

CROSS-REFERENCE TO RELATED APPLICATIONS

This application is a continuation of International Application No. PCT/CN2016/085051, filed on Jun. 7, 2016, the disclosure of which is hereby incorporated by reference in its entirety.

TECHNICAL FIELD

The present invention relates to the communications field, and in particular, to a service processing method and apparatus.

BACKGROUND

The Secure Socket Layer (SSL) protocol and its successor: the Transport Layer Security (TLS) protocol are used to provide services such as encryption, identity authentication, and data integrity for network communication, and are already widely applied to secure communication between a browser and a network server. The SSL/TLS protocol is located between the Transmission Control Protocol (TCP) at a transport layer and the Hypertext Transfer Protocol (HTTP) at an application layer.

A service processing method provided by a related technology includes: User equipment (UE) and a network server set up an encrypted connection based on the Hypertext Transfer Protocol over the SSL/TLS protocol (HTTPS), and agree upon a key; after encrypting service information by using the key, the user equipment sends the encrypted service information to the network server; the network server obtains the service information through decryption by using the key, generates service data based on the service information, and after encrypting the service data, sends the encrypted service data to the user equipment; and the user equipment obtains the service data through decryption by using the key. The service information may be used to request a web page from the network server, or may be used to request an object from the network server.

Generally, an intermediary device may also be disposed between the user equipment and the network server. If an intermediary device exists, ciphertext obtained through encryption is transmitted between the user equipment and the network server when the encrypted connection is set up between the user equipment and the network server. Because the intermediary device cannot obtain the key, the intermediary device cannot decrypt the ciphertext. Consequently, the intermediary device cannot provide the service optimization function for the user equipment.

SUMMARY

To resolve a problem that an intermediary device cannot provide service optimization for user equipment and a network server because the intermediary device cannot decrypt ciphertext, embodiments of the present invention provide a service processing method and apparatus. The technical solutions are as follows:

According to a first aspect, a service processing method is provided, and the method includes: receiving, by a key management function entity, trigger information sent by an intermediary device, where the trigger information is obtained after UE starts a procedure of setting up an encrypted connection to a network server; and assisting, based on the trigger information, the intermediary device in negotiating with the UE and the network server, to enable the intermediary device to obtain a first key, where the first key is used by the intermediary device to decrypt ciphertext sent by the UE and the network server, the ciphertext is obtained after the UE or the network server encrypts service information by using a second key, and the first key is corresponding to the second key.

Because data transmitted between the UE and the network server needs to be forwarded by the intermediary device, and the intermediary device is transparent to the UE, the intermediary device needs to negotiate with the UE and the server with the assistance of the key management function entity, then obtains the first key after the negotiation succeeds, and uses the first key to decrypt the ciphertext transmitted between the UE and the network server, to provide service optimization. This resolves a problem that the intermediary device cannot provide service optimization for the user equipment and the network server because the intermediary device cannot decrypt ciphertext, and achieves an effect of expanding an application scope of service optimization.

In one embodiment, the assisting, by the key management function entity based on the trigger information, the intermediary device in negotiating with the UE and the network server, to enable the intermediary device to obtain a first key includes: obtaining, by the key management function entity, the first key from the UE after determining, based on the trigger information, that the negotiation with the network server succeeds, and sending the first key to the intermediary device; or negotiating, by the key management function entity, with the UE based on the trigger information, obtaining the first key from the network server after the negotiation succeeds, and sending the first key to the intermediary device; or negotiating, by the key management function entity, with the UE based on the trigger information, and after the negotiation succeeds, triggering the intermediary device to obtain the first key from the network server; or obtaining, by the key management function entity, the first key from the network server based on the trigger information when an encrypted connection is set up between the key management function entity and the network server, and sending the first key to the intermediary device.

The key management function entity not only can assist the intermediary device in obtaining the first key from the network server, but also can assist the intermediary device in obtaining the first key from the UE. Therefore, a plurality of implementations are provided for obtaining the first key by the intermediary device.

In one embodiment, the obtaining, by the key management function entity, the first key from the UE after determining, based on the trigger information, that the negotiation with the network server succeeds, and sending the first key to the intermediary device includes: when the trigger information is a first key obtaining request sent by the intermediary device, sending, by the key management function entity, a first decryption request to the network server, receiving a first decryption response that carries a signature of the network server and that is sent by the network server, generating a second key obtaining request carrying the signature of the network server, sending the second key obtaining request to the UE, receiving the first key sent by the UE after the UE has verified the signature of the network server by using a third key, and sending the first key to the intermediary device; or when the trigger information is a third key obtaining request that carries a signature of the network server and that is sent by the intermediary device, generating, by the key management function entity, a fourth key obtaining request carrying the signature of the network server, sending the fourth key obtaining request to the UE, receiving the first key sent by the UE after the UE has verified the signature of the network server by using a third key, and sending the first key to the intermediary device, where the signature of the network server is obtained by the intermediary device from a second decryption response obtained after the intermediary device sends a second decryption request to the network server; where the third key is obtained by the UE from the network server when the UE sets up the encrypted connection, the signature of the network server is obtained after the network server uses a fourth key to encrypt first confirm information that is successfully negotiated, and the fourth key is corresponding to the third key.

In one embodiment, the negotiating, by the key management function entity, with the UE based on the trigger information, obtaining the first key from the network server after the negotiation succeeds, and sending the first key to the intermediary device includes: when the trigger information is a fifth key obtaining request sent by the intermediary device, sending, by the key management function entity, a third decryption request to the UE, receiving a third decryption response that carries a signature of the UE and a fifth key and that is sent by the UE, generating a fifth key obtaining request carrying the signature of the UE and the fifth key, sending the fifth key obtaining request to the network server, receiving the first key sent by the network server after the network server has verified the signature of the UE by using the fifth key, and sending the first key to the intermediary device; where signature information of the UE is obtained after the UE uses a sixth key to encrypt second confirm information that is successfully negotiated, and the sixth key is corresponding to the fifth key.

In one embodiment, the negotiating, by the key management function entity, with the UE based on the trigger information, and after the negotiation succeeds, triggering the intermediary device to obtain the first key from the network server includes: when the trigger information is a fourth decryption request sent by the intermediary device, forwarding, by the key management function entity, the fourth decryption request to the UE, receiving a fourth decryption response that carries a signature of the UE and a fifth key and that is sent by the UE, and forwarding the fourth decryption response to the intermediary device, where the fourth decryption response is used to instruct the intermediary device to send a sixth key obtaining request carrying the signature of the UE and the fifth key to the network server, and to receive the first key sent by the network server after the network server has verified the signature of the UE by using the fifth key; where signature information of the UE is obtained after the UE uses a sixth key to encrypt second confirm information that is successfully negotiated, and the sixth key is corresponding to the fifth key.

In one embodiment, the obtaining, by the key management function entity, the first key from the network server based on the trigger information when an encrypted connection is set up between the key management function entity and the network server, and sending the first key to the intermediary device includes: when the trigger information is a seventh key obtaining request sent by the intermediary device and an encrypted connection is set up between the key management function entity and the network server, forwarding, by the key management function entity, the seventh key obtaining request to the network server, receiving the first key that is sent by the network server when the network server determines that an encrypted connection is set up between the key management function entity and the network server, and sending the first key to the intermediary device.

According to a second aspect, a service processing method is provided, and the method includes: assisting, by UE with the assistance of a key management function entity and a network server, an intermediary device in obtaining a first key; and encrypting, by the UE, service information by using a second key, to obtain ciphertext, and sending the ciphertext to the network server by using the intermediary device; or receiving, by the UE, ciphertext forwarded by the intermediary device, where the ciphertext is obtained after the network server encrypts service information by using a second key and is sent by the network server to the intermediary device; where the first key is used by the intermediary device to decrypt the ciphertext, and the first key is corresponding to the second key.

Because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment and the network server because the intermediary device cannot decrypt ciphertext, and achieves an effect of expanding an application scope of service optimization.

In one embodiment, the assisting, by UE with the assistance of a key management function entity and a network server, an intermediary device in obtaining a first key includes: receiving, by the UE, a key obtaining request sent by the key management function entity, where the key obtaining request carries a signature of the network server, and the signature of the server is obtained after the network server uses a fourth key to encrypt first confirm information that is successfully negotiated; decrypting, by the UE, the signature of the network server by using a third key, and determining that verification succeeds when obtaining the first confirm information, where the third key is obtained by the UE from the network server when the UE sets up an encrypted connection, and the third key is corresponding to the fourth key; and sending, by the UE, the first key to the key management function entity after the verification succeeds, where the first key is sent by the key management function entity to the intermediary device.

In one embodiment, the assisting, by UE with the assistance of a key management function entity and a network server, an intermediary device in obtaining a first key includes: receiving, by the UE, a decryption request sent by the key management function entity; encrypting, by the UE by using a sixth key, second confirm information that is successfully negotiated, to obtain a signature of the UE; and generating, by the UE, a decryption response carrying the signature of the UE and a fifth key, and sending the decryption response to the key management function entity, where the key management function entity is configured to send the decryption response to the intermediary device, and the intermediary device is configured to generate a key obtaining request carrying the signature of the UE and the fifth key, send the key obtaining request to the network server, and receive the first key sent by the network server after the network server has verified the signature of the UE by using the fifth key; or the key management function entity is configured to generate a key obtaining request carrying the signature of the UE and the fifth key, send the key obtaining request to the network server, obtain the first key sent by the network server after the network server has verified the signature of the UE by using the fifth key, and send the first key to the intermediary device; where the fifth key is corresponding to the sixth key.

According to a third aspect, a service processing method is provided, and the method includes: assisting, by a network server with the assistance of a key management function entity and UE, an intermediary device in obtaining a first key; and receiving, by the network server, ciphertext forwarded by the intermediary device, where the ciphertext is obtained after the UE encrypts service information by using a second key and is sent by the UE to the intermediary device; or encrypting, by the network server, service information by using a second key, to obtain ciphertext, and sending the ciphertext to the UE by using the intermediary device; where the first key is used by the intermediary device to decrypt the ciphertext, and the first key is corresponding to the second key.

The network server needs to trigger, with the assistance of the key management function entity and the UE, the intermediary device to obtain the first key, so that the intermediary device uses the first key to decrypt the ciphertext transmitted between the UE and the network server, to provide service optimization. This resolves a problem that the intermediary device cannot provide service optimization for the user equipment and the network server because the intermediary device cannot decrypt ciphertext, and achieves an effect of expanding an application scope of service optimization.

In one embodiment, the assisting, by a network server with the assistance of a key management function entity and UE, an intermediary device in obtaining a first key includes: receiving, by the network server, a decryption request sent by the intermediary device; encrypting, by the network server by using a fourth key, first confirm information that is successfully negotiated, to obtain a signature of the network server; and generating, by the network server, a decryption response carrying the signature of the network server, and sending the decryption response to the intermediary device, where the intermediary device is configured to generate a key obtaining request carrying the signature of the network server and send the key obtaining request to the key management function entity, and the key management function entity is configured to forward the key obtaining request to the UE, receive the first key sent by the UE after the UE has verified the signature of the network server by using a third key, and forward the first key to the intermediary device.

In one embodiment, the assisting, by a network server with the assistance of a key management function entity and UE, an intermediary device in obtaining a first key includes: receiving, by the network server, a decryption request sent by the key management function entity; encrypting, by the network server by using a fourth key, first confirm information that is successfully negotiated, to obtain a signature of the network server; and generating, by the network server, a decryption response carrying the signature of the network server, and sending the decryption response to the key management function entity, where the key management function entity generates a key obtaining request carrying the signature of the network server, sends the key obtaining request to the UE, receives the first key sent by the UE after the UE has verified the signature of the network server by using a third key, and forwards the first key to the intermediary device.

In one embodiment, the assisting, by a network server with the assistance of a key management function entity and UE, an intermediary device in obtaining a first key includes: receiving, by the network server, a key obtaining request sent by the intermediary device, where the key obtaining request carries a signature of the UE and a fifth key, the signature of the UE is obtained after the UE uses a sixth key to encrypt second confirm information that is successfully negotiated, and the fifth key is corresponding to the sixth key; decrypting, by the network server, the signature of the UE by using the fifth key, and when the second confirm information is obtained, determining that verification succeeds; and sending, by the network server, the first key to the intermediary device after the verification succeeds.

In one embodiment, the assisting, by a network server with the assistance of a key management function entity and UE, an intermediary device in obtaining a first key includes: receiving, by the network server, a key obtaining request sent by the key management function entity, where the key obtaining request carries a signature of the UE and a fifth key, the signature of the UE is obtained after the UE uses a sixth key to encrypt second confirm information that is successfully negotiated, and the fifth key is corresponding to the sixth key; decrypting, by the network server, the signature of the UE by using the fifth key, and when the second confirm information is obtained, determining that verification succeeds; and sending, by the network server, the first key to the key management function entity after the verification succeeds, where the first key is sent by the key management function entity to the intermediary device.

In one embodiment, the assisting, by a network server with the assistance of a key management function entity and UE, an intermediary device in obtaining a first key includes: receiving, by the network server, a key obtaining request sent by the key management function entity; and sending, by the network server, the first key to the key management function entity when determining that an encrypted connection is set up between the key management function entity and the network server, where the first key is sent by the key management function entity to the intermediary device.

According to a fourth aspect, a service processing apparatus is provided, the apparatus includes at least one unit, and the at least one unit is configured to implement the service processing method provided in the first aspect or at least one implementation of the first aspect.

According to a fifth aspect, a service processing apparatus is provided, the apparatus includes at least one unit, and the at least one unit is configured to implement the service processing method provided in the second aspect or at least one implementation of the second aspect.

According to a sixth aspect, a service processing apparatus is provided, the apparatus includes at least one unit, and the at least one unit is configured to implement the service processing method provided in the third aspect or at least one implementation of the third aspect.

According to a seventh aspect, a service processing apparatus is provided, the apparatus includes a processor and a transceiver coupled to the processor, the transceiver is configured to be controlled by the processor, and the processor is configured to implement the service processing method provided in the first aspect or at least one implementation of the first aspect.

According to an eighth aspect, a service processing apparatus is provided, the apparatus includes a processor and a transceiver coupled to the processor, the transceiver is configured to be controlled by the processor, and the processor is configured to implement the service processing method provided in the second aspect or at least one implementation of the second aspect.

According to a ninth aspect, a service processing apparatus is provided, the apparatus includes a processor and a transceiver coupled to the processor, the transceiver is configured to be controlled by the processor, and the processor is configured to implement the service processing method provided in the third aspect or at least one implementation of the third aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

FIG. 6A-1 and FIG. 6A-2 are a method flowchart of a service processing method according to an embodiment of the present invention;

FIG. 6B-1 and FIG. 6B-2 are a schematic diagram of an implementation of a service processing method according to an embodiment of the present invention;

FIG. 7A-1 and FIG. 7A-2 are a method flowchart of a service processing method according to an embodiment of the present invention;

FIG. 7B-1 and FIG. 7B-2 are a schematic diagram of an implementation of a service processing method according to an embodiment of the present invention;

FIG. 8A-1 and FIG. 8A-2 are a method flowchart of a service processing method according to an embodiment of the present invention;

FIG. 8B-1 and FIG. 8B-2 are a schematic diagram of an implementation of a service processing method according to an embodiment of the present invention;

FIG. 9A-1 and FIG. 9A-2 are a method flowchart of a service processing method according to an embodiment of the present invention;

FIG. 9B-1 and FIG. 9B-2 are a schematic diagram of an implementation of a service processing method according to an embodiment of the present invention;

FIG. 10B-1 and FIG. 10B-2 are a schematic diagram of an implementation of a service processing method according to an embodiment of the present invention;

DESCRIPTION OF EMBODIMENTS

To make the objectives, technical solutions, and advantages of the present invention clearer, the following further describes the implementations of the present invention in detail with reference to the accompanying drawings.

Figure 1:
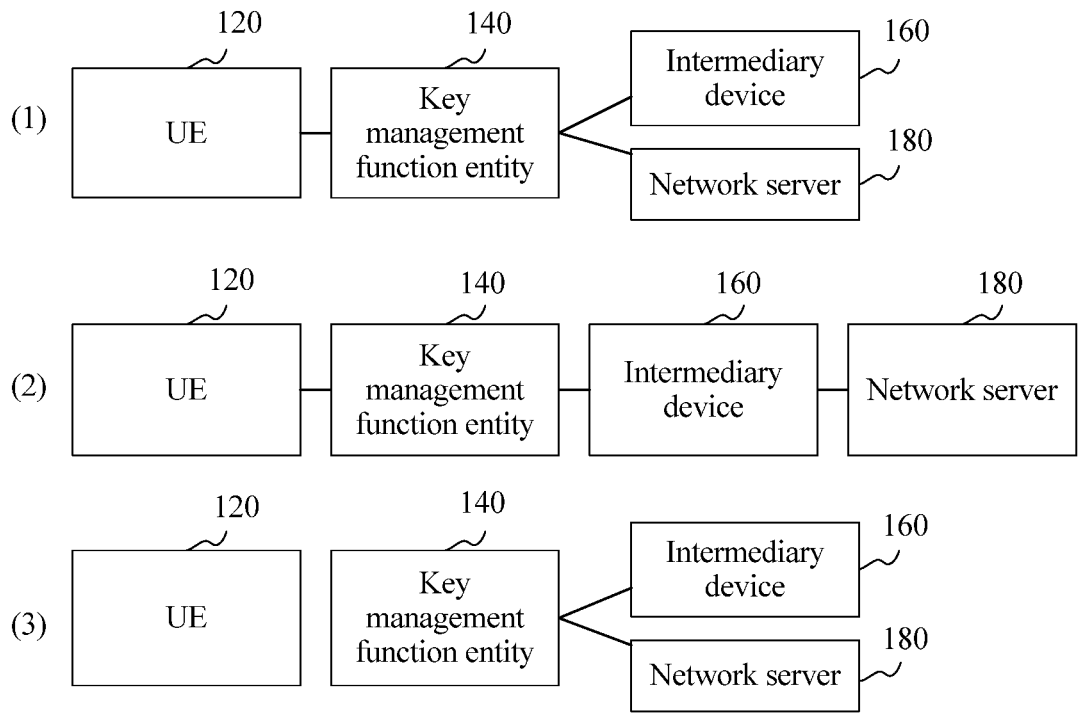
FIG. 1 is a schematic structural diagram of a service processing system according to an embodiment of the present invention.

FIG. 1 is a schematic structural diagram of a service processing system according to an example embodiment of the present invention. The service processing system includes UE 120, a key management function entity 140, an intermediary device 160, and a network server 180.

In one embodiment, the UE 120 and the key management function entity 140 set up an encrypted connection, and the key management function entity 140 separately sets up an encrypted connection to the intermediary device 160 and the network server 180.

In one embodiment, the UE 120 and the key management function entity 140 set up an encrypted connection, the key management function entity 140 and the intermediary device 160 set up an encrypted connection, and the intermediary device 160 and the network server 180 set up an encrypted connection.

In one embodiment, the key management function entity 140 separately sets up an encrypted connection to the intermediary device 160 and the network server 180.

The encrypted connection may be a connection based on HTTPS over the SSL protocol/TLS protocol.

The UE 120 may be a cellphone, a smartphone, a computer, a tablet computer, a wearable device, a personal digital assistant (PDA), a mobile Internet device (MID), an e-book reader, and the like.

The key management function entity 140 is configured to manage a key, may be a trusted and authoritative server such as an operator server, and can attempt to verify an identity of the UE by using a digital certificate. For example, a domain name of the key management function entity is KeyManagement function entity.node.epc.mnc<MNC>.mcc<MCC>.3gppnetwork.org.

The intermediary device 160 may be a TLS proxy, an edge server, and the like, and the edge server may include a content delivery network (CDN) server. This is not limited in this embodiment.

Figure 2:
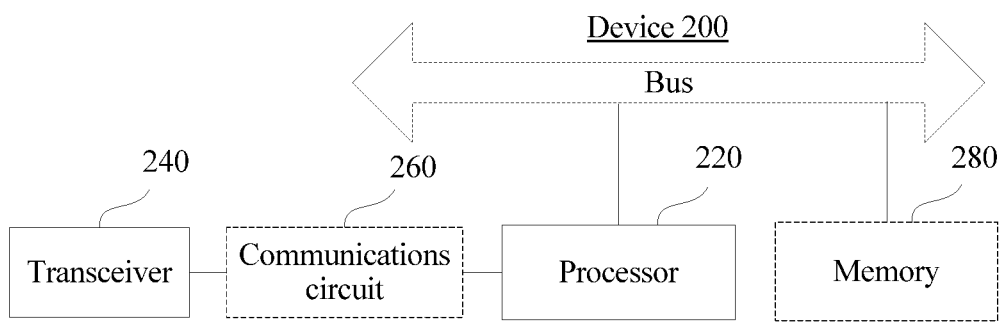
FIG. 2 is a schematic structural diagram of a device according to an embodiment of the present invention.

FIG. 2 is a schematic structural diagram of a device 200 shown in another example embodiment of the present invention. The device 200 may be the UE 120, the key management function entity 140, the intermediary device 160, or the network server 180 shown in FIG. 1. The wireless device 200 includes a processor 220 and a transceiver 240 coupled to the processor 220.

The transceiver 240 may include one or more antennas, and the antenna enables the device 200 to send or receive a radio signal.

The transceiver 240 may be connected to a communications circuit 260. The communications circuit 260 may perform various processing on a signal received by using the transceiver 240 or a signal sent by using the transceiver 240, for example, modulate a signal sent by using the transceiver 240 and demodulate a signal received by using the transceiver 240. In actual implementation, the communications circuit 260 may include a radio frequency (RF) chip and a baseband chip.

The communications circuit 260 may be connected to the processor 220. Alternatively, the communications circuit 260 may be integrated into the processor 220. The processor 220 is a control center of the device 200. The processor 220 may be a central processing unit (CPU), a network processor (NP), or a combination of a CPU and an NP. The processor 220 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

A memory 280 is connected to the processor 220 by using a bus or in another manner, and the memory 280 may be a volatile memory, a non-volatile memory, or a combination thereof. The volatile memory may be a random access memory (RAM), for example, a static random access memory (SRAM) or a dynamic random access memory (DRAM). The nonvolatile memory may be a read-only memory (ROM), for example, a programmable read-only memory (PROM), an erasable programmable read-only memory (EPROM), or an electrically erasable programmable read-only memory (EEPROM). Alternatively, the non-volatile memory may be a flash memory or a magnetic memory, for example, a magnetic tape, a floppy disk or a hard disk. Alternatively, the non-volatile memory may be an optical disc.

Figure 3:
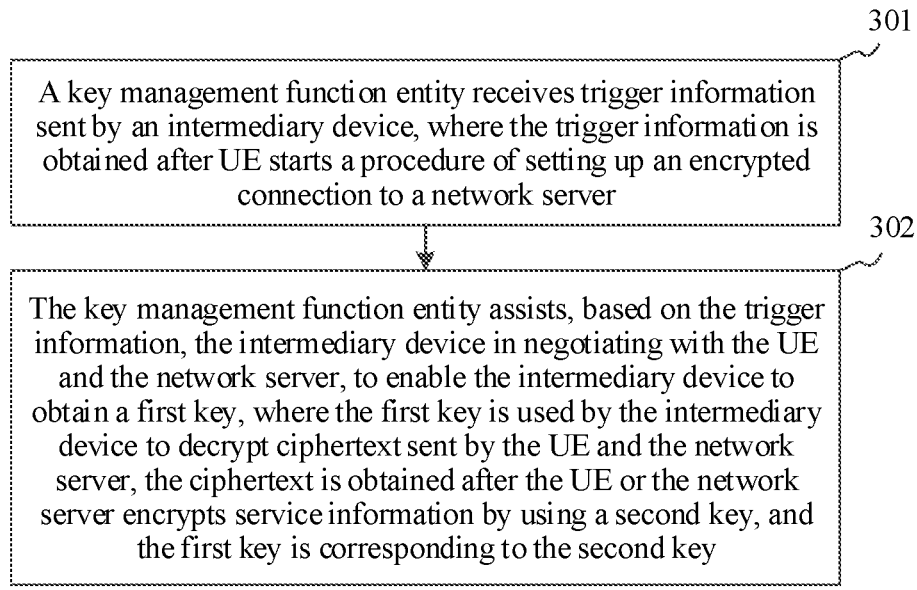
FIG. 3 is a method flowchart of a service processing method according to an embodiment of the present invention.

FIG. 3 is a method flowchart of a service processing method according to an embodiment of the present invention. The service processing method may include the following operations.

Operation 301: A key management function entity receives trigger information sent by an intermediary device, where the trigger information is obtained after UE starts a procedure of setting up an encrypted connection to a network server.

Operation 302: The key management function entity assists, based on the trigger information, the intermediary device in negotiating with the UE and the network server, to enable the intermediary device to obtain a first key, where the first key is used by the intermediary device to decrypt ciphertext sent by the UE and the network server, the ciphertext is obtained after the UE or the network server encrypts service information by using a second key, and the first key is corresponding to the second key.

In conclusion, according to the service processing method provided in this embodiment of the present invention, because data transmitted between the UE and the network server needs to be forwarded by the intermediary device, and the intermediary device is transparent to the UE, the intermediary device needs to negotiate with the UE and the server with the assistance of the key management function entity, then obtains the first key after the negotiation succeeds, and uses the first key to decrypt the ciphertext transmitted between the UE and the network server, to provide service optimization. This resolves a problem that the intermediary device cannot provide service optimization for the user equipment and the network server because the intermediary device cannot decrypt ciphertext, and achieves an effect of expanding an application scope of service optimization.

Figure 4:
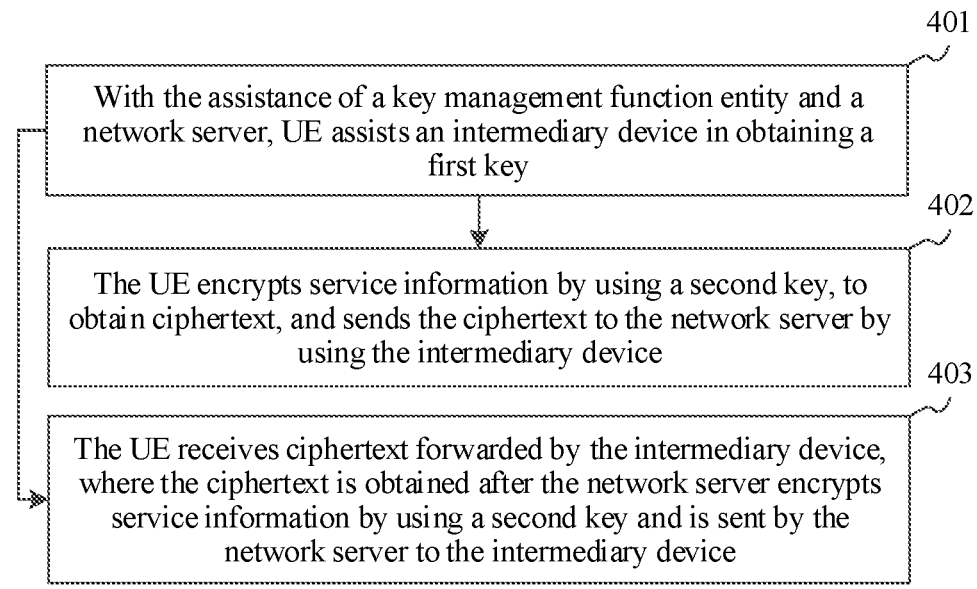
FIG. 4 is a method flowchart of a service processing method according to an embodiment of the present invention.

FIG. 4 is a method flowchart of a service processing method according to an embodiment of the present invention. The service processing method may include the following operations.

Operation 401: With the assistance of a key management function entity and a network server, UE assists an intermediary device in obtaining a first key.

Operation 402: The UE encrypts service information by using a second key, to obtain ciphertext, and sends the ciphertext to the network server by using the intermediary device.

Operation 403: The UE receives ciphertext forwarded by the intermediary device, where the ciphertext is obtained after the network server encrypts service information by using a second key and is sent by the network server to the intermediary device.

The first key is used by the intermediary device to decrypt the ciphertext, and the first key is corresponding to the second key.

Either operation 402 or operation 403 may be performed.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment and the network server because the intermediary device cannot decrypt ciphertext, and achieves an effect of expanding an application scope of service optimization.

Figure 5:
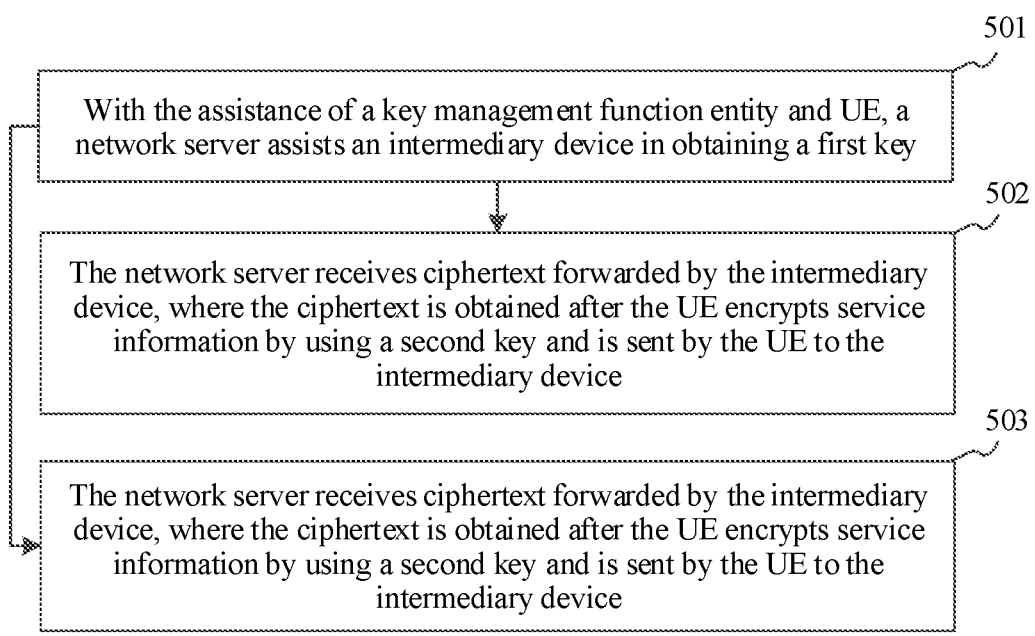
FIG. 5 is a method flowchart of a service processing method according to an embodiment of the present invention.

FIG. 5 is a method flowchart of a service processing method according to an embodiment of the present invention. The service processing method may include the following operations.

Operation 501: With the assistance of a key management function entity and UE, a network server assists an intermediary device in obtaining a first key.

Operation 502: The network server receives ciphertext forwarded by the intermediary device, where the ciphertext is obtained after the UE encrypts service information by using a second key and is sent by the UE to the intermediary device.

Operation 503: The network server encrypts service information by using the second key to obtain ciphertext, and sends the ciphertext to the UE by using the intermediary device.

The first key is used by the intermediary device to decrypt the ciphertext, and the first key is corresponding to the second key.

Either operation 502 or operation 503 may be performed.

In conclusion, according to the service processing method provided in this embodiment of the present invention, the network server needs to trigger, with the assistance of the key management function entity and the UE, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figures 1, 6A:
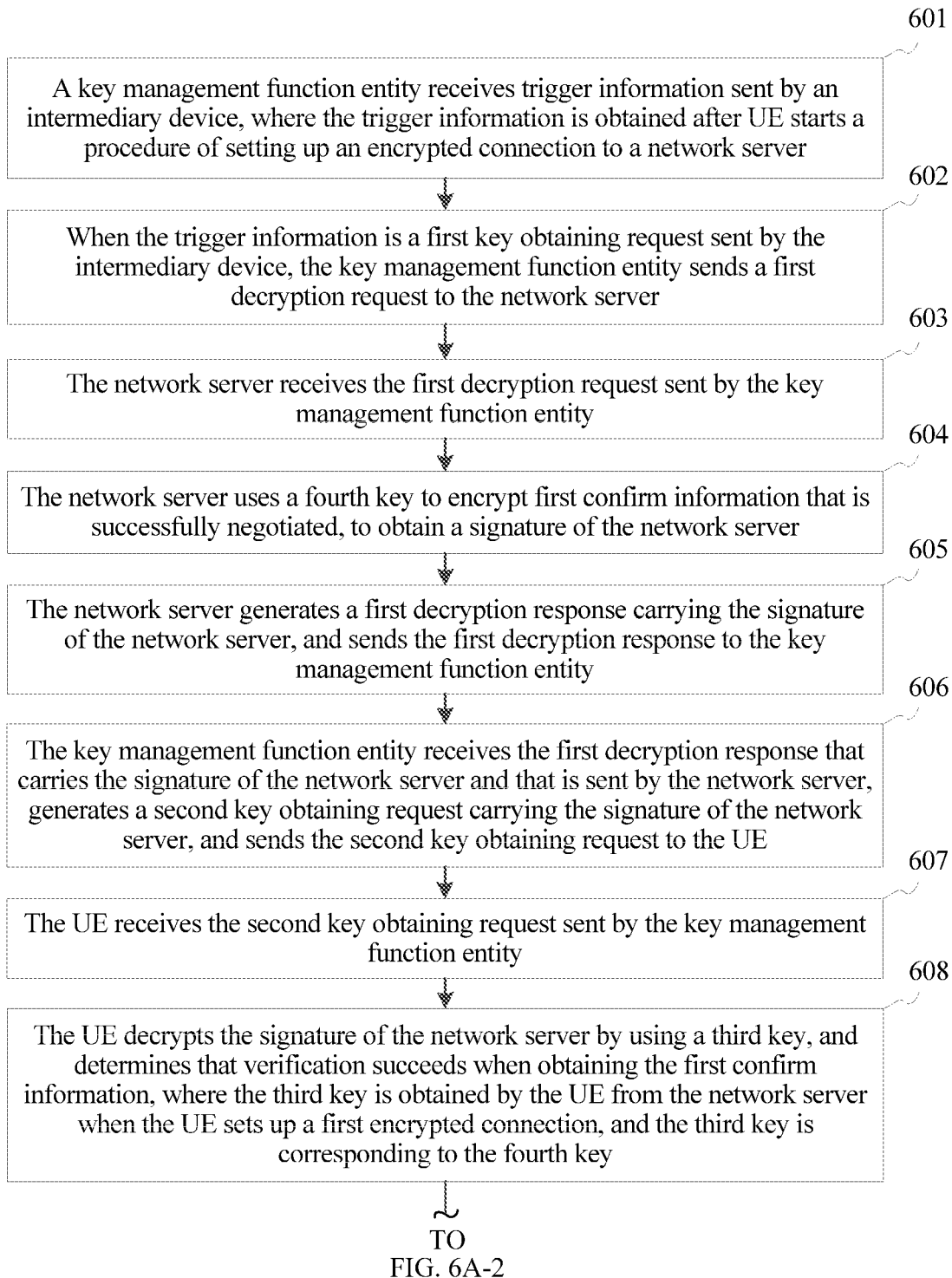

FIG. 6A-1 and FIG. 6A-2 are a method flowchart of a service processing method according to an embodiment of the present invention. The service processing method is applied to the first implementation scenario. A key management function entity negotiates with a network server based on a request, obtains a first key from UE after the negotiation succeeds, and sends the first key to an intermediary device. The service processing method may include the following operations.

Operation 601: The key management function entity receives trigger information sent by the intermediary device, where the trigger information is obtained after the UE starts a procedure of setting up an encrypted connection to the network server.

If the UE needs to access the network server, the UE first needs to set up a connection to the network server, and then the UE accesses the network server by using the connection. The connection may be an unencrypted connection based on HTTP, or may be an encrypted connection based on HTTPS over the SSL protocol/TLS protocol.

Optionally, the intermediary device may be disposed between the UE and the network server, and the intermediary device is configured to forward data transmitted between the UE and the network server. Specifically, if an unencrypted connection is set up between the UE and the network server, and data transmitted between the UE and the network server is a plaintext, the intermediary device directly forwards the plaintext and does not perform service optimization for the plaintext. If an encrypted connection is set up between the UE and the network server, and service information transmitted between the UE and the network server is ciphertext, the intermediary device needs to decrypt the ciphertext and perform service optimization for the service information obtained through decryption. The intermediary device needs to use a key negotiated by the UE and the network server when decrypting the ciphertext. Therefore, the intermediary device needs to obtain the key from the UE or the network server.

To obtain the key negotiated by the UE and the network server, the intermediary device may set up, in place of the network server, an encrypted connection to the UE, and set up, in place of the UE, an encrypted connection to the network server.

Specifically, the UE sends a Transmission Control Protocol (TCP) setup request to the network server. The TCP setup request includes an Internet Protocol (IP for short) address of the UE and an IP address of the network server. The intermediary device intercepts the TCP setup request sent by the UE to the network server, sets up, in place of the network server, a TCP connection to the UE based on the IP address of the network server, and sets up, in place of the UE, a TCP connection to the network server based on the IP address of the UE. The UE sends an encryption setup request to the network server by using the TCP connections. The intermediary device intercepts the encryption setup request that is sent by the UE to the network server by using the TCP connections, sets up, in place of the network server, an encrypted connection to the UE based on the encryption setup request, and sets up, in place of the UE, an encrypted connection to the network server based on the encryption setup request.

Information in the TCP setup request includes a source IP address, a source port, a destination IP address, and a destination port. The source is the UE, and the destination is the network server. Ports of the TCP connection include port 80 and port 443. If the UE needs to access the network server based on the HTTP protocol, the port of the TCP connection is port 80. If the UE needs to access the network server based on the HTTPS protocol, the port of the TCP connection is port 443. In this embodiment, an example in which the UE accesses the network server based on the HTTPS protocol is used for description. In this case, the port of the TCP connection is port 443.

In a three-way handshake phase of a TCP connection, the intermediary device uses the IP address of the network server as a source IP address of the intermediary device, uses the IP address of the UE as a destination IP address, interacts with the UE to complete a three-way handshake, and sets up, in place of the network server, a TCP connection to the UE. The intermediary device sends a TCP setup request to the network server, where a source IP address in the TCP setup request is the IP address of the UE, and a destination IP address is the IP address of the network server. In a three-way handshake phase of a TCP connection, the intermediary device uses the IP address of the UE as a source IP address of the intermediary device, uses the IP address of the network server as a destination IP address, interacts with the network server to complete a three-way handshake, and sets up, in place of the UE, a TCP connection to the network server. In this case, after the TCP connection between the UE and the intermediary device and the TCP connection between the intermediary device and the network server are set up, a path is formed between the UE, the intermediary device, and the network server. In this case, the UE may send the encryption setup request to the network server by using the TCP connections.

Because a process of setting up an encrypted connection based on the SSL protocol is similar to a process of setting up an encrypted connection based on the TLS protocol, the following uses the encrypted connection based on the TLS protocol as an example for description.

(1) The intermediary device intercepts a TLS protocol version number, an encryption algorithm list, and a first random number that are sent by the UE to the network server, and forwards the TLS protocol version number, the encryption algorithm list, and the first random number to the network server.

(2) If the network server supports the TLS protocol version, the network server selects an encryption algorithm from the encryption algorithm list, and sends the TLS protocol version number, the encryption algorithm, a session identifier, and a second random number to the UE.

(3) The intermediary device intercepts the TLS protocol version number, the encryption algorithm, the session identifier, and the second random number that are sent by the network server to the UE, and forwards the TLS protocol version number, the encryption algorithm, the session identifier, and the second random number to the UE.

(4) The intermediary device intercepts a digital certificate of the network server that is sent by the network server to the UE, and forwards the digital certificate to the UE.

(5) The intermediary device intercepts a first complete message sent by the network server to the UE, and forwards the first complete message to the UE.

(6) The UE attempts to verify the digital certificate, and after the verification succeeds, obtains a public key in the digital certificate, generates a premaster key, encrypts the premaster key by using the public key, and sends obtained public key exchange information to the network server.

In this case, the UE generates a second key based on the first random number, the second random number, the premaster key, and the encryption algorithm. The second key includes a client write message authentication code (MAC) secret (client write MAC secret), a server write MAC secret, a client write key, and a server write key. The client write MAC secret and the server write MAC secret are used to verify whether a message is tampered halfway. The client write key is used by a client to encrypt information and is used by a server to decrypt information. The server write key is used by a server to encrypt information and is used by a client to decrypt information.

(7) The intermediary device intercepts the public key exchange information sent by the UE to the network server, and forwards the public key exchange information to the network server.

(8) The intermediary device intercepts a password change description sent by the UE to the network server, forwards the password change description to the network server, and instructs the network server to start negotiated parameters.

(9) The intermediary device intercepts a second complete message sent by the UE to the network server, and forwards the second complete message to the network server.

The second complete message includes a hash value, so that the network server performs verification based on the hash value. The hash value is obtained after the UE performs a hash operation on all content sent to the network server.

(10) The intermediary device intercepts a password change description sent by the network server to the UE, forwards the password change description to the UE, and instructs the UE to start negotiated parameters.

In this case, the network server decrypts the public key exchange information by using a private key, to obtain the premaster key, and generates a second key based on the first random number, the second random number, the premaster key, and the encryption algorithm. The second key generated by the network server is the same as the second key generated by the UE.

(11) The intermediary device intercepts a third complete message sent by the network server to the UE, and forwards the third complete message to the UE.

The third complete message includes a hash value, so that the UE performs verification based on the hash value. The hash value is obtained after the network server performs a hash operation on all content sent to the UE.

Because the intermediary device does not have the private key of the network server, the intermediary device cannot decrypt the public key exchange information and therefore cannot obtain the first key. The first key is the premaster key; or the first key includes the first random number, the second random number, the premaster key, and the encryption algorithm; or the first key is the second key generated by the UE or the network server based on the first random number, the second random number, the premaster key, and the encryption algorithm.

In this embodiment, the intermediary device may obtain the first key from the UE or the network server. In the first implementation, the first key obtained by the intermediary device from the UE or the network server is the premaster key, and the intermediary device calculates the second key based on the first random number, the second random number, and the encryption algorithm that are previously intercepted. In the second implementation, the first key obtained by the intermediary device from the UE or the network server includes the first random number, the second random number, the premaster key, and the encryption algorithm, and the intermediary device generates the second key based on the first key. In the third implementation, the first key obtained by the intermediary device from the UE or the network server is the second key generated based on the first random number, the second random number, the premaster key, and the encryption algorithm. This is not limited in this embodiment. The operation in which the intermediary device obtains the first key may be performed after it is determined that the UE needs to set up an encrypted connection to the network server, that is, performed after the UE sends the TLS protocol version number, the encryption algorithm list, and the first random number to the network server, and needs to be performed when ciphertext sent by the UE or the network server is received at the latest. The ciphertext is obtained after the UE or the network server encrypts service information by using the second key.

In this embodiment, with the assistance of the key management function entity, the intermediary device negotiates with the UE and the network server to obtain the first key. The key management function entity and the intermediary device may be deployed in a same entity, or may be deployed in different entities. This is not limited in this embodiment. When the key management function entity and the intermediary device are deployed in a same entity, the key management function entity and the intermediary device may interact with each other by using an internal module. When the key management function entity and the intermediary device are deployed in different entities, the key management function entity needs to separately set up an encrypted connection to the UE and the intermediary device, interaction between the key management function entity and the UE may be performed based on the SSL/TLS protocol, IPsec, and the like, and interaction between the key management function entity and the intermediary device may be performed based on the SSL/TLS protocol, IPsec, and the like. The UE may set up an encrypted connection to the key management function entity during power-on, or may set up an encrypted connection to the key management function entity in a communication process. The key management function entity may set up an encrypted connection to the intermediary device in advance, or may set up an encrypted connection to the intermediary device when the intermediary device needs to obtain the first key.

Before the UE sets up the encrypted connection to the key management function entity, the UE further needs to discover the key management function entity first. This embodiment provides two manners of discovering the key management function entity by the UE. The following describes the two discovery manners separately. In a first discovery manner, IP addresses or domain names of a plurality of key management function entities are configured in the UE, and the UE may set up encrypted connections to the key management function entities in turn based on the IP addresses or the domain names. In a second discovery implementation, when the intermediary device and the key management function entity are both located in a PDN gateway (PGW for short), because the UE needs to access the PGW, and the PGW allocates an IP address to the UE, the UE may directly determine the key management function entity, and set up an encrypted connection to the key management function entity.

The trigger information is used to instruct the key management function entity to assist the intermediary device in obtaining the first key. When the key management function entity and the intermediary device are deployed in a same entity, the trigger information may be the TLS protocol version number, the encryption algorithm list, and the first random number that are intercepted by the intermediary device, or may be the ciphertext sent by the UE that is intercepted by the intermediary device, or may be information received at any moment between moments of receiving the foregoing two kinds of information. When the key management function entity and the intermediary device are deployed in different entities, the trigger information may be information sent by the intermediary device to the key management function entity after the intermediary device obtains predetermined information. The predetermined information may be the TLS protocol version number, the encryption algorithm list, and the first random number that are intercepted by the intermediary device, or may be the ciphertext sent by the UE that is intercepted by the intermediary device, or may be information received at any moment between moments of receiving the foregoing two kinds of information.

Optionally, before the key management function entity assists the intermediary device in obtaining the first key, the intermediary device may further obtain an identifier of the network server, and determine, based on the identifier of the network server, whether service optimization needs to be provided for data transmitted between the UE and the network server. Specifically, the intermediary device presets a whitelist; after obtaining the identifier of the network server, the intermediary device detects whether the identifier of the network server is in the whitelist; and when the identifier of the network server is in the whitelist, the intermediary device sends a request to the key management function entity; or when the identifier of the network server is not in the whitelist, the procedure ends. The identifier of the network server may be a server name indication (SNI for short) or the IP address. The SNI may be carried in the encrypted request that is sent by the UE to the network server and intercepted by the intermediary device. The IP address may be carried in the TCP setup request that is sent by the UE to the network server and intercepted by the intermediary device.

Operation 602: When the trigger information is a first key obtaining request sent by the intermediary device, the key management function entity sends a first decryption request to the network server.

Both the first key obtaining request and the first decryption request carry the session identifier, and the session identifier may be an IP 5-tuple to indicate a correspondence between the first key and a session connection. The IP 5-tuple includes the IP address of the UE, the IP address of the network server, the UE port, the server port, and a transport protocol TCP.

In one embodiment, the first key obtaining request is as follows:

```
ClientKeyRequest:
POST / ClientKeyRequest HTTP/1.1
Host:
KeyManagementFunctionEntity.node.epc.mnc<MNC>.mcc<MCC>.3gppnetwork.org
Content-Type: application/json
Content-Length: 256
{
"protocol": "TLS 1.1",
"session-id":                                                           "
session-id-1:client-ip,server-ip,client-port,server-port,transport-protocol",
"decryption-reason":"network optimization",
}
```

The first decryption request is as follows:

```
keyComfirmRequest:
POST / keyComfirmRequest HTTP/1.1
Host: server.example.com
Content-Type: application/json
Content-Length: 256
```

```
{
"protocol": "TLS 1.1",
"session-id":                                                           "
session-id-1:client-ip,server-ip,client-port,server-port,transport-protocol",
"decryption-reason":"network optimization",
}
```

Operation 603: The network server receives the first decryption request sent by the key management function entity.

Operation 604: The network server uses a fourth key to encrypt first confirm information that is successfully negotiated, to obtain a signature of the network server.

After determining, based on the session identifier, that the negotiation succeeds, the network server generates the first confirm information, and encrypts the first confirm information by using the fourth key to obtain the signature of the network server. The fourth key may be the private key of the network server.

Operation 605: The network server generates a first decryption response carrying the signature of the network server, and sends the first decryption response to the key management function entity.

In addition to the signature of the network server, the first decryption response further needs to include the session identifier.

In a possible implementation, the first decryption response is as follows:

```
keyComfirmResponse:
HTTP/1.1 200 OK
Content-Type: application/json
Content-Length: 13
{
"output": "ok(digital signature of server)"
}
```

Operation 606: The key management function entity receives the first decryption response that carries the signature of the network server and that is sent by the network server, generates a second key obtaining request carrying the signature of the network server, and sends the second key obtaining request to the UE.

In addition to the signature of the network server, the second key obtaining request further needs to include the session identifier.

In a possible implementation, the second key obtaining request is as follows:

```
ClientKeyRequest:
POST / ClientKeyRequest Request HTTP/1.1
Host:
KeyManagementFunctionEntity.node.epc.mnc<MNC>.mcc<MCC>.3gppnetwork.org
 Content-Type: application/json
 Content-Length: 256
 {
 "protocol": "TLS 1.1",
 "session-id":                                                              "
session-id-1:client-ip,server-ip,client-port,server-port,transport-protocol",
 "keyComfirmResponse": "ok(digital signature of server)"
 "decryption-reason":"network optimization",
 }
```

Operation 607: The UE receives the second key obtaining request sent by the key management function entity.

Operation 608: The UE decrypts the signature of the network server by using a third key, and determines that verification succeeds when obtaining the first confirm information, where the third key is obtained by the UE from the network server when the UE sets up the encrypted connection, and the third key is corresponding to the fourth key.

When the fourth key is the private key of the network server, the third key is the public key of the network server, and the public key of the network server is provided in the digital certificate of the network server.

Operation 609: After the verification succeeds, the UE sends the first key to the key management function entity, and the first key is sent by the key management function entity to the intermediary device.

Specifically, after the verification succeeds, the UE determines the first key based on the session identifier, generates a key response carrying the first key and the session identifier, and sends the key response to the key management function entity.

If the first key is the premaster key, in a possible implementation, the key response is as follows:

```
ClientKeyResponse:
HTTP/1.1 200 OK
 Content-Type: application/json
 Content-Length: 64
 {
 "session-id":                                                              "
session-id-1:client-ip,server-ip,client-port,server-port,transport-protocol",
 "output": "pre-master secret"
 }
```

Operation 610: The key management function entity receives the first key sent by the UE after the UE has verified the signature of the network server by using the third key, and sends the first key to the intermediary device.

The key management function entity may forward the received key response to the intermediary device, and the intermediary device obtains the first key from the key response.

After obtaining the first key, the intermediary device obtains the second key based on the first key and uses the second key to decrypt ciphertext sent by the UE and the network server. Operations 611 and 612 are performed when the intermediary device uses the second key to decrypt ciphertext sent by the UE. Operations 613 and 614 are performed when the intermediary device uses the second key to decrypt ciphertext sent by the network server.

Operation 611: The UE encrypts service information by using a second key, to obtain ciphertext, and sends the ciphertext to the network server by using the intermediary device, where the second key is corresponding to the first key, and the first key is used by the intermediary device to decrypt the ciphertext.

When intercepting the ciphertext sent by the UE and obtaining the second key based on the first key, the intermediary device reads the client write key from the second key, decrypts the ciphertext by using the client write key, to obtain the service information. In an implementation, the intermediary device performs service optimization on the service information, encrypts, by using the client write key, the service information on which service optimization is performed, to obtain ciphertext, and sends the ciphertext to the network server. In another implementation, the intermediary device does not perform service optimization on the service information, directly encrypts the service information by using the client write key, to obtain ciphertext, and sends the ciphertext to the network server.

Operation 612: The network server receives the ciphertext forwarded by the intermediary device.

The network server receives the ciphertext, decrypts the ciphertext by using the client write key, to obtain the service information, and processes the service information.

Operation 613: The network server encrypts service information by using a second key, to obtain ciphertext, and sends the ciphertext to the UE by using the intermediary device, where the second key is corresponding to the first key, and the first key is used by the intermediary device to decrypt the ciphertext.

When intercepting the ciphertext sent by the network server and obtaining the second key based on the first key, the intermediary device reads the server write key from the second key, decrypts the ciphertext by using the server write key, to obtain the service information. In an implementation, the intermediary device performs service optimization on the service information, encrypts, by using the server write key, the service information on which service optimization is performed, to obtain ciphertext, and sends the ciphertext to the UE. In another implementation, the intermediary device does not perform service optimization on the service information, directly encrypts the service information by using the server write key, to obtain ciphertext, and sends the ciphertext to the UE.

Operation 614: The UE receives the ciphertext forwarded by the intermediary device.

The UE receives the ciphertext, decrypts the ciphertext by using the server write key, to obtain the service information, and processes the service information.

It should be noted that when the encrypted connection between the UE and the intermediary device and the encrypted connection between the intermediary device and the network server are disconnected, the intermediary device continues maintaining the correspondence between the session identifier and the first key for a period of time, so that when subsequently the UE and the intermediary device, and the intermediary device and the network server are quickly reconnected, the intermediary device can directly determine the first key based on the session identifier and the correspondence, and does not need to obtain the first key from the UE or the network server, thereby improving processing efficiency. Details are not described in the following again.

Figures 1, 6B:
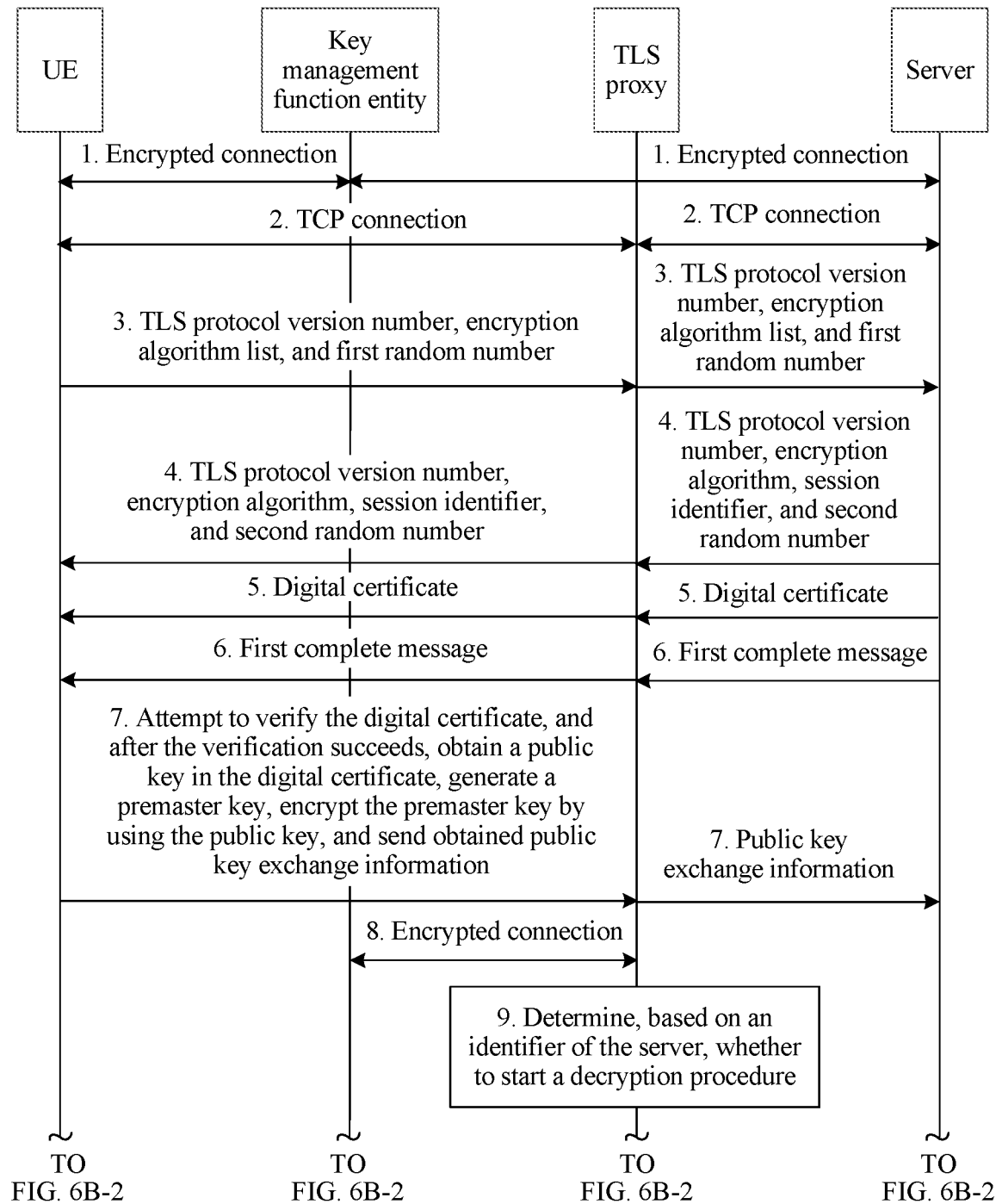
Figures 2, 6B:
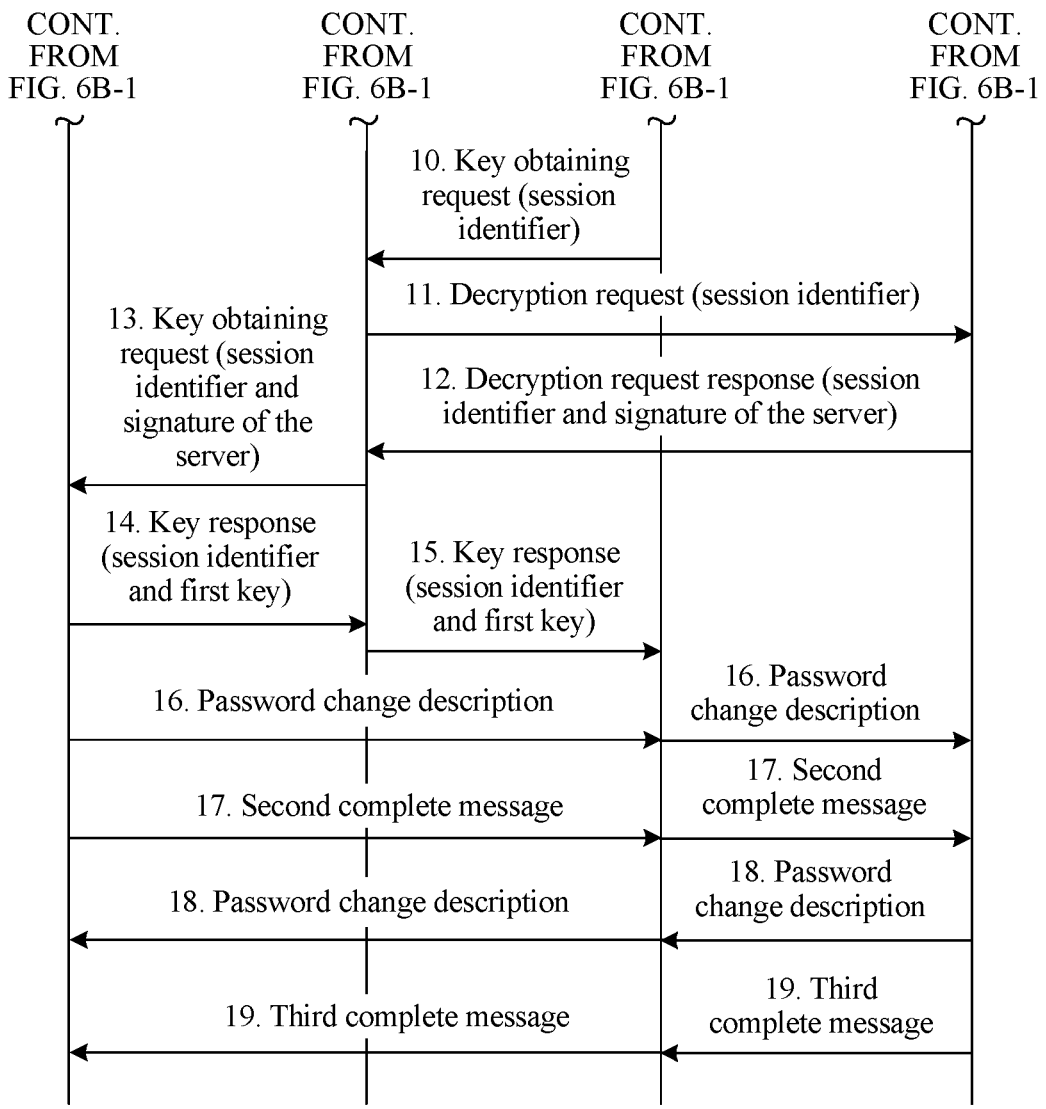

Referring to FIG. 6B-1 and FIG. 6B-2, for ease of understanding, in this embodiment, an implementation process of this embodiment is described by using an example in which the key management function entity is a key management function entity, the intermediary device is a TLS proxy, and the network server is a server.

1. The UE sets up an encrypted connection to the key management function entity, and the key management function entity sets up an encrypted connection to the server.

2. The UE sets up a TCP connection to the TLS proxy, and the TLS proxy sets up a TCP connection to the server.

Specifically, the TLS proxy intercepts a TCP setup request sent by the UE to the server, sets up, in place of the server, a TCP connection to the UE based on an IP address of the server, and sets up, in place of the UE, a TCP connection to the server based on an IP address of the UE.

3. The TLS proxy intercepts a TLS protocol version number, an encryption algorithm list, and a first random number that are sent by the UE to the server, and forwards the TLS protocol version number, the encryption algorithm list, and the first random number to the server.

4. If the server supports the TLS protocol version, the server selects an encryption algorithm from the encryption algorithm list, and sends the TLS protocol version number, the encryption algorithm, a session identifier, and a second random number to the UE. The TLS proxy intercepts the TLS protocol version number, the encryption algorithm, the session identifier, and the second random number sent by the server to the UE, and forwards the TLS protocol version number, the encryption algorithm, the session identifier, and the second random number to the UE.

5. The server sends a digital certificate to the UE, and the TLS proxy intercepts the digital certificate, and forwards the digital certificate to the UE.

6. The server sends a first complete message to the UE, and the TLS proxy intercepts the first complete message, and forwards the first complete message to the UE.

7. The UE attempts to verify the digital certificate, and after the verification succeeds, obtains a public key in the digital certificate, generates a premaster key, encrypts the premaster key by using the public key, and sends obtained public key exchange information to the server. The TLS proxy intercepts the public key exchange information, and forwards the public key exchange information to the server.

8. The TLS proxy sets up an encrypted connection to the key management function entity.

An execution sequence of operation 1, operation 8, and operations 2 to 7 is not limited in this embodiment.

9. The TLS proxy obtains an identifier of the server, determines, based on the identifier of the server, whether a decryption procedure needs to be started, and performs the next operation when determining that the decryption procedure needs to be started.

10. The TLS proxy sends a key obtaining request carrying the session identifier to the key management function entity.

11. The key management function entity sends a decryption request carrying the session identifier to the server.

12. The server sends a decryption request response carrying the session identifier and a signature of the server to the key management function entity.

13. The key management function entity sends a key obtaining request carrying the session identifier and the signature of the server to the UE.

14. After the UE has verified the signature of the server, the UE sends a key response carrying the session identifier and a first key to the key management function entity.

15. The key management function entity sends the key response carrying the session identifier and the first key to the TLS proxy.

16. The UE sends a password change description to the server. The TLS proxy intercepts the password change description, and forwards the password change description to the server.

17. The UE sends a second complete message to the server. The TLS proxy intercepts the second complete message, and forwards the second complete message to the server.

18. The server sends a password change description to the UE. The TLS proxy intercepts the password change description, forwards the password change description to the UE, and instructs the UE to start negotiated parameters.

19. The server sends a third complete message to the UE. The TLS proxy intercepts the third complete message, and forwards the third complete message to the UE.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figures 1, 7A:
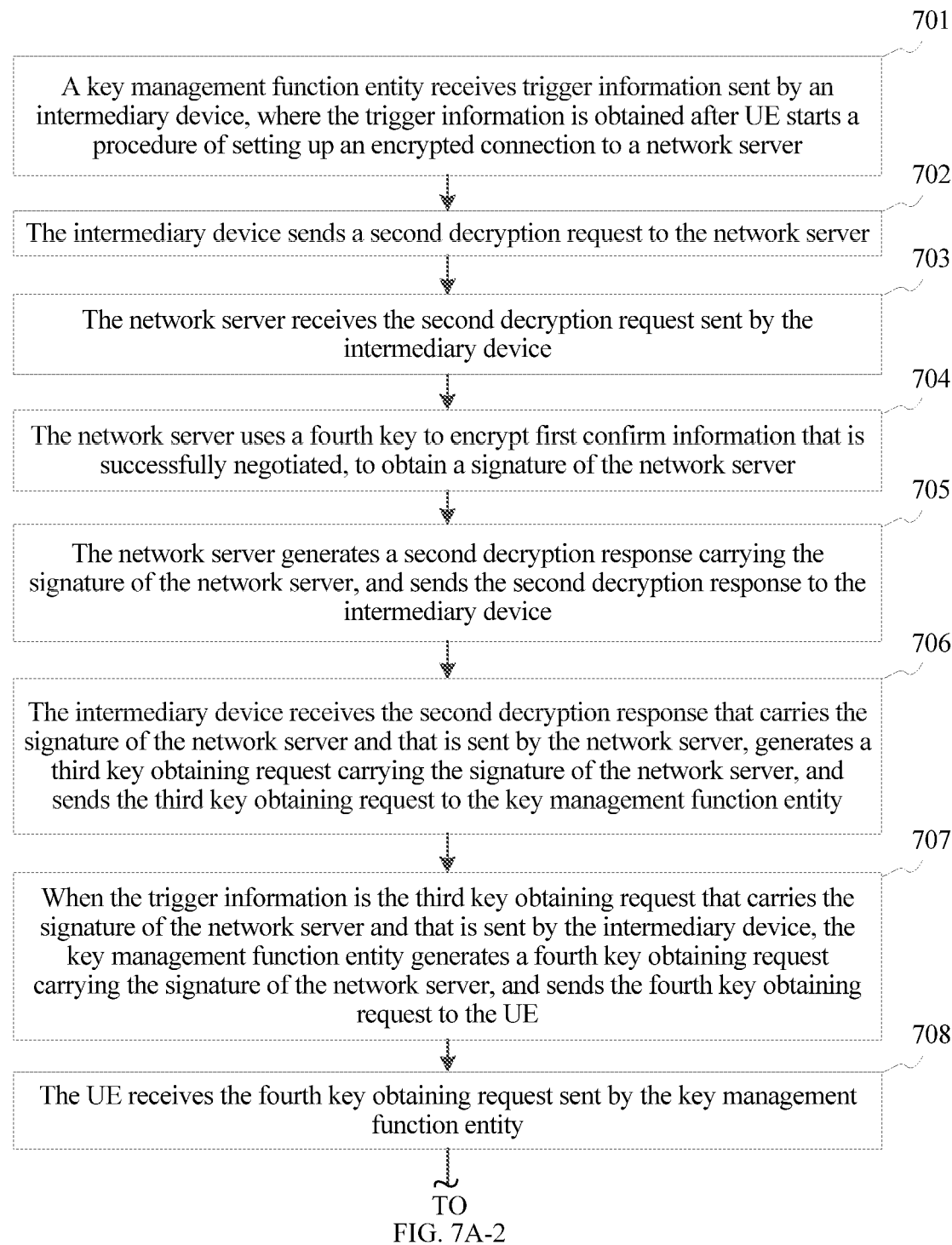

FIG. 7A-1 and FIG. 7A-2 are a method flowchart of a service processing method according to an embodiment of the present invention. The service processing method is applied to the second implementation scenario. A key management function entity obtains a first key from UE after determining, based on a request, that negotiation with a network server succeeds, and sends the first key to an intermediary device. The service processing method may include the following operations.

Operation 701: The key management function entity receives trigger information sent by the intermediary device, where the trigger information is obtained after the UE starts a procedure of setting up an encrypted connection to the network server.

For details about operation 701, refer to the description of operation 601. The details are not described herein.

Operation 702: The intermediary device sends a second decryption request to the network server.

Because an encrypted connection is set up between the intermediary device and the network server, the intermediary device can directly send the second decryption request carrying a session identifier to the network server. For details about the session identifier, refer to the description in operation 604.

Operation 703: The network server receives the second decryption request sent by the intermediary device.

Operation 704: The network server uses a fourth key to encrypt first confirm information that is successfully negotiated, to obtain a signature of the network server.

After determining, based on the session identifier, that the negotiation succeeds, the network server generates the first confirm information, and encrypts the first confirm information by using the fourth key to obtain the signature of the network server. The fourth key may be a private key of the network server.

Operation 705: The network server generates a second decryption response carrying the signature of the network server, and sends the second decryption response to the intermediary device.

In addition to the signature of the network server, the second decryption response further needs to include the session identifier.

Operation 706: The intermediary device receives the second decryption response that carries the signature of the network server and that is sent by the network server, generates a third key obtaining request carrying the signature of the network server, and sends the third key obtaining request to the key management function entity.

In addition to the signature of the network server, the third key obtaining request further needs to include the session identifier.

Operation 707: When the trigger information is the third key obtaining request that carries the signature of the network server and that is sent by the intermediary device, the key management function entity generates a fourth key obtaining request carrying the signature of the network server, and sends the fourth key obtaining request to the UE.

In addition to the signature of the network server, the fourth key obtaining request further needs to include the session identifier.

Operation 708: The UE receives the fourth key obtaining request sent by the key management function entity.

Operation 709: The UE decrypts the signature of the network server by using a third key, and determines that verification succeeds when obtaining the first confirm information, where the third key is obtained by the UE from the network server when the UE sets up the encrypted connection, and the third key is corresponding to the fourth key.

When the fourth key is the private key of the network server, the third key is a public key of the network server, and the public key of the network server is provided in a digital certificate of the network server.

Operation 710: After the verification succeeds, the UE sends the first key to the key management function entity, and the first key is sent by the key management function entity to the intermediary device.

Specifically, after the verification succeeds, the UE determines the first key based on the session identifier, generates a key response carrying the first key and the session identifier, and sends the key response to the key management function entity.

Operation 711: The key management function entity receives the first key sent by the UE after the UE has verified the signature of the network server by using the third key, and sends the first key to the intermediary device.

The key management function entity may forward the received key response to the intermediary device, and the intermediary device obtains the first key from the key response.

After obtaining the first key, the intermediary device obtains a second key based on the first key and uses the second key to decrypt ciphertext sent by the UE and the network server. Operations 712 and 713 are performed when the intermediary device uses the second key to decrypt ciphertext sent by the UE. For a specific implementation procedure, refer to the description of operations 611 and 612. Operations 714 and 715 are performed when the intermediary device uses the second key to decrypt ciphertext sent by the network server. For a specific implementation procedure, refer to the description of operations 613 and 614.

Operation 712: The UE encrypts service information by using a second key, to obtain ciphertext, and sends the ciphertext to the network server by using the intermediary device, where the second key is corresponding to the first key, and the first key is used by the intermediary device to decrypt the ciphertext.

Operation 713: The network server receives the ciphertext forwarded by the intermediary device.

Operation 714: The network server encrypts service information by using a second key, to obtain ciphertext, and sends the ciphertext to the UE by using the intermediary device, where the second key is corresponding to the first key, and the first key is used by the intermediary device to decrypt the ciphertext.

Operation 715: The UE receives the ciphertext forwarded by the intermediary device.

Figures 1, 7B:
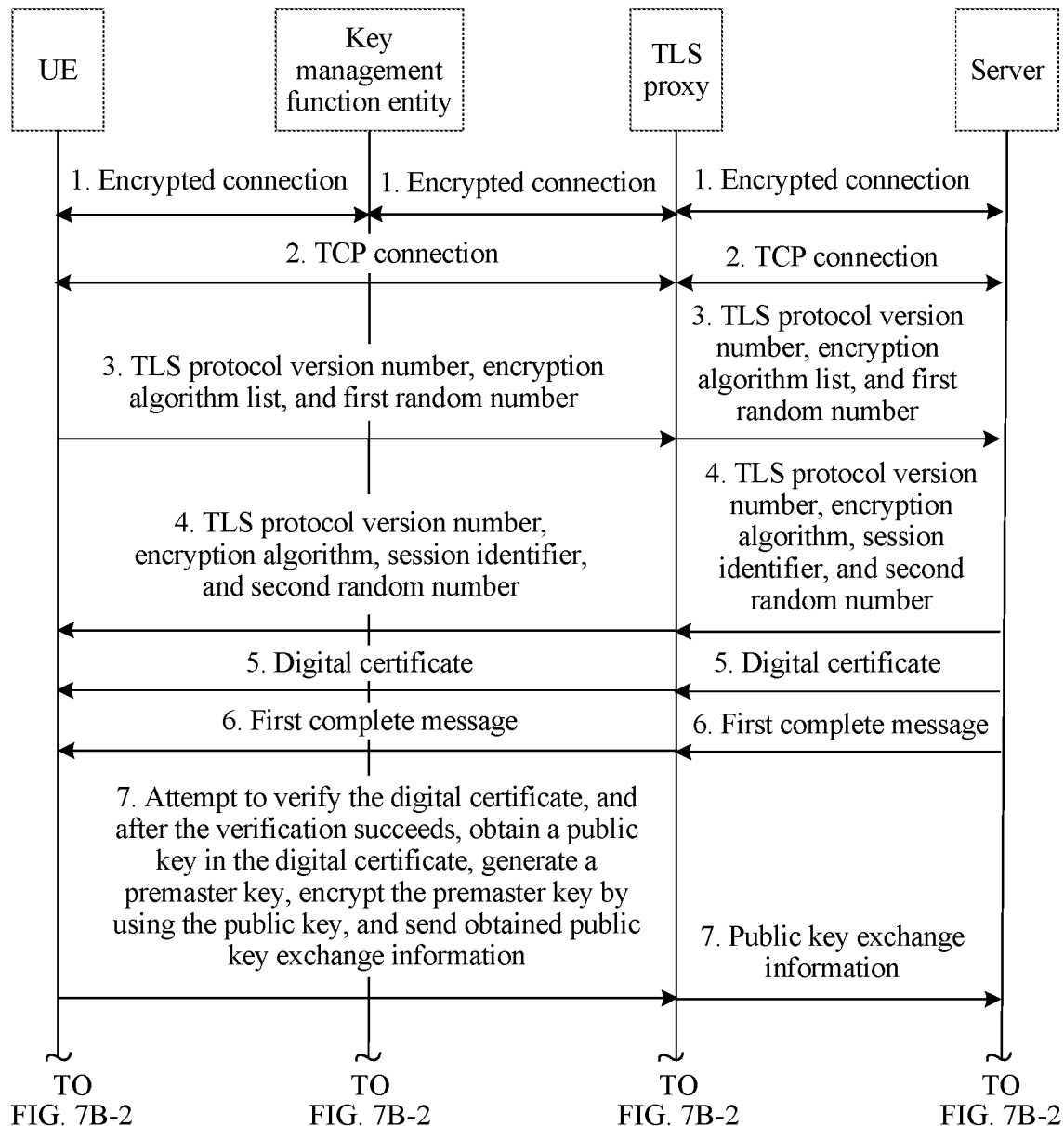
Figures 2, 7B:
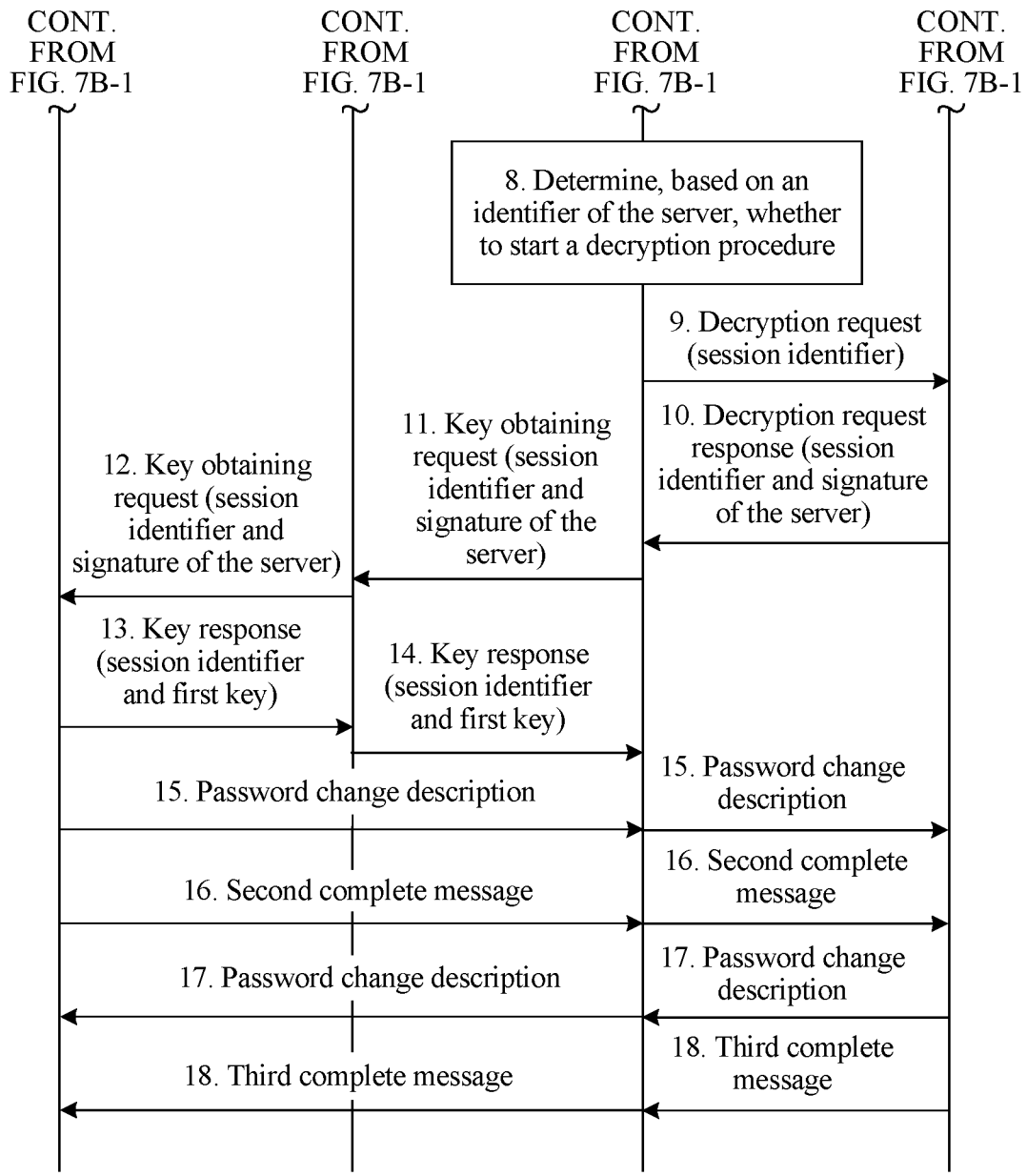

Referring to FIG. 7B-1 and FIG. 7B-2, for ease of understanding, in this embodiment, an implementation process of this embodiment is described by using an example in which the key management function entity is a key management function entity, the intermediary device is a TLS proxy, and the network server is a server.

1. The UE sets up an encrypted connection to the key management function entity, the key management function entity sets up an encrypted connection to the TLS proxy, and the TLS proxy sets up an encrypted connection to the server.

2. The UE sets up a TCP connection to the TLS proxy, and the TLS proxy sets up a TCP connection to the server.

Specifically, the TLS proxy intercepts a TCP setup request sent by the UE to the server, sets up, in place of the server, a TCP connection to the UE based on an IP address of the server, and sets up, in place of the UE, a TCP connection to the server based on an IP address of the UE.

3. The TLS proxy intercepts a TLS protocol version number, an encryption algorithm list, and a first random number that are sent by the UE to the server, and forwards the TLS protocol version number, the encryption algorithm list, and the first random number to the server.

4. If the server supports the TLS protocol version, the server selects an encryption algorithm from the encryption algorithm list, and sends the TLS protocol version number, the encryption algorithm, a session identifier, and a second random number to the UE. The TLS proxy intercepts the TLS protocol version number, the encryption algorithm, the session identifier, and the second random number sent by the server to the UE, and forwards the TLS protocol version number, the encryption algorithm, the session identifier, and the second random number to the UE.

5. The server sends a digital certificate to the UE, and the TLS proxy intercepts the digital certificate, and forwards the digital certificate to the UE.

6. The server sends a first complete message to the UE, and the TLS proxy intercepts the first complete message, and forwards the first complete message to the UE.

7. The UE attempts to verify the digital certificate, and after the verification succeeds, obtains a public key in the digital certificate, generates a premaster key, encrypts the premaster key by using the public key, and sends obtained public key exchange information to the server. The TLS proxy intercepts the public key exchange information, and forwards the public key exchange information to the server.

An execution sequence of operation 1 and operations 2 to 7 is not limited in this embodiment.

8. The TLS proxy obtains an identifier of the server, determines, based on the identifier of the server, whether a decryption procedure needs to be started, and performs the next step when determining that the decryption procedure needs to be started.

9. The TLS proxy sends a decryption request carrying the session identifier to the server.

10. The server sends a decryption request response carrying the session identifier and a signature of the server to the TLS proxy.

11. The TLS proxy sends a key obtaining request carrying the session identifier and the signature of the server to the key management function entity.

12. The key management function entity sends a key obtaining request carrying the session identifier and the signature of the server to the UE.

13. After the UE has verified the signature of the server, the UE sends a key response carrying the session identifier and a first key to the key management function entity.

14. The key management function entity sends the key response carrying the session identifier and the first key to the TLS proxy.

15. The UE sends a password change description to the server. The TLS proxy intercepts the password change description, and forwards the password change description to the server.

16. The UE sends a second complete message to the server. The TLS proxy intercepts the second complete message, and forwards the second complete message to the server.

17. The server sends a password change description to the UE. The TLS proxy intercepts the password change description, forwards the password change description to the UE, and instructs the UE to start negotiated parameters.

18. The server sends a third complete message to the UE. The TLS proxy intercepts the third complete message, and forwards the third complete message to the UE.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figures 1, 8A:
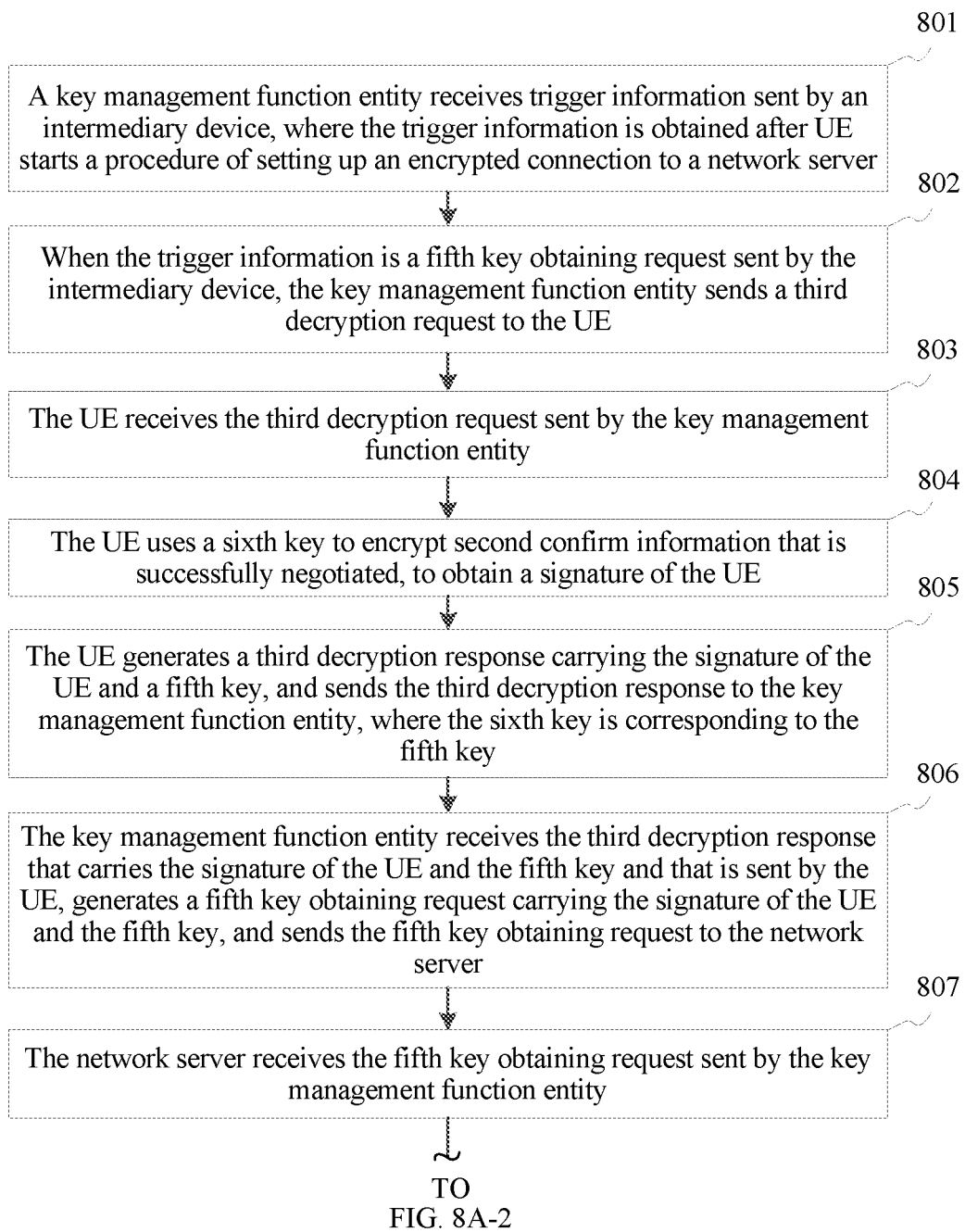
Figures 2, 8A:
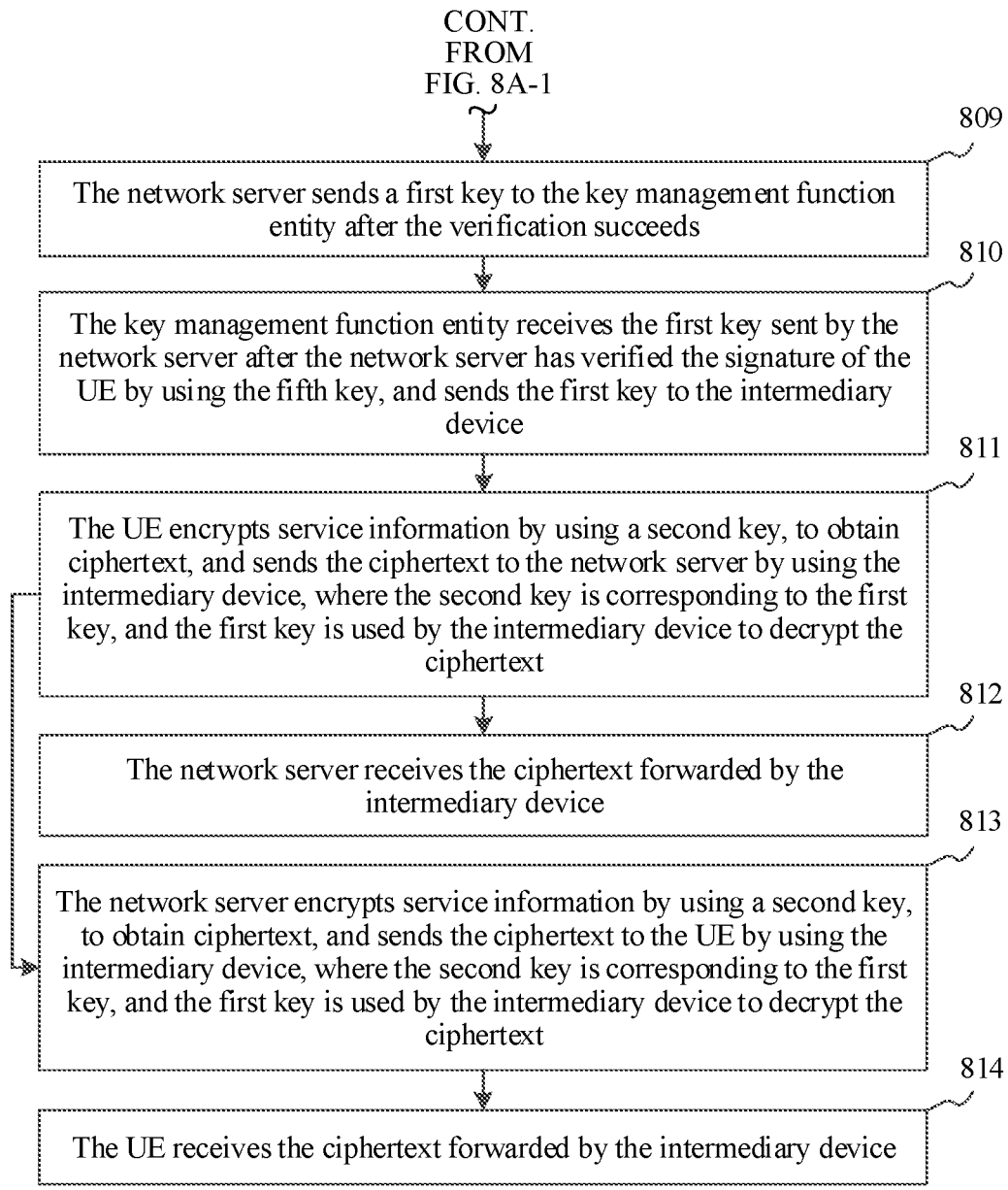

FIG. 8A-1 and FIG. 8A-2 are a method flowchart of a service processing method according to an embodiment of the present invention. The service processing method is applied to the first implementation scenario. A key management function entity negotiates with UE based on a request, obtains a first key from a network server after the negotiation succeeds, and sends the first key to an intermediary device. The service processing method may include the following operations.

Operation 801: The key management function entity receives trigger information sent by the intermediary device, where the trigger information is obtained after the UE starts a procedure of setting up an encrypted connection to the network server.

For details about operation 801, refer to the description of operation 601. The details are not described herein.

Operation 802: When the trigger information is a fifth key obtaining request sent by the intermediary device, the key management function entity sends a third decryption request to the UE.

Both the fifth key obtaining request and the third decryption request carry a session identifier.

Operation 803: The UE receives the third decryption request sent by the key management function entity.

Operation 804: The UE uses a sixth key to encrypt second confirm information that is successfully negotiated, to obtain a signature of the UE.

After determining, based on the session identifier, that the negotiation succeeds, the UE generates first confirm information, and encrypts the first confirm information by using the sixth key to obtain the signature of the UE. The sixth key may be a private key of the UE.

Operation 805: The UE generates a third decryption response carrying the signature of the UE and a fifth key, and sends the third decryption response to the key management function entity, where the sixth key is corresponding to the fifth key.

In addition to the signature of the UE, the third decryption response further needs to include the session identifier and the fifth key. When the sixth key is the private key of the UE, the fifth key may be a public key of the UE.

Optionally, because the fifth key is in a digital certificate of the UE, the fifth key in the third decryption response may be replaced with the digital certificate of the UE.

Operation 806: The key management function entity receives the third decryption response that carries the signature of the UE and the fifth key and that is sent by the UE, generates a fifth key obtaining request carrying the signature of the UE and the fifth key, and sends the fifth key obtaining request to the network server.

In a possible implementation, the third decryption response is as follows:

```
keyComfirmResponse:
HTTP/1.1 200 OK
Content-Type: application/json
Content-Length: 13
{
"UE Certificate": "( UE Certificate content)"
"output": "ok"
}
```

In addition to the signature of the UE, the fifth key obtaining request further needs to include the session identifier. In a possible implementation, the fifth key obtaining request is as follows:

```
ClientKeyRequest:
POST / ClientKeyRequest Request HTTP/1.1
Host:
```

```
KeyManagementFunctionEntity.node.epc.mnc<MNC>.mcc<MCC>.3gppnetwork.org
 Content-Type: application/json
 Content-Length: 256
 {
 "protocol": "TLS 1.1",
 "session-id":                                               "
session-id-1:client-ip,server-ip,client-port,server-port,transport-protocol",
 "UE Certificate": "( UE Certificate content)"
 "keyComfirmResponse": "ok(digital signature of UE)",
 "decryption-reason":"network optimization",
 }
```

Operation 807: The network server receives the fifth key obtaining request sent by the key management function entity.

Operation 808: The network server decrypts the signature of the UE by using the fifth key, and when the second confirm information is obtained, determines that verification succeeds.

Operation 809: The network server sends the first key to the key management function entity after the verification succeeds.

Specifically, after the verification succeeds, the network server determines the first key based on the session identifier, generates a key response carrying the first key and the session identifier, and sends the key response to the key management function entity.

Operation 810: The key management function entity receives the first key sent by the network server after the network server has verified the signature of the UE by using the fifth key, and sends the first key to the intermediary device.

The key management function entity may forward the received key response to the intermediary device, and the intermediary device obtains the first key from the key response.

After obtaining the first key, the intermediary device obtains a second key based on the first key and uses the second key to decrypt ciphertext sent by the UE and the network server. Operations 811 and 812 are performed when the intermediary device uses the second key to decrypt ciphertext sent by the UE. For a specific implementation procedure, refer to the description of operations 611 and 612. Operations 813 and 814 are performed when the intermediary device uses the second key to decrypt ciphertext sent by the network server. For a specific implementation procedure, refer to the description of operations 613 and 614.

Operation 811: The UE encrypts service information by using a second key, to obtain ciphertext, and sends the ciphertext to the network server by using the intermediary device, where the second key is corresponding to the first key, and the first key is used by the intermediary device to decrypt the ciphertext.

Operation 812: The network server receives the ciphertext forwarded by the intermediary device.

Operation 813: The network server encrypts service information by using a second key, to obtain ciphertext, and sends the ciphertext to the UE by using the intermediary device, where the second key is corresponding to the first key, and the first key is used by the intermediary device to decrypt the ciphertext.

Operation 814: The UE receives the ciphertext forwarded by the intermediary device.

Figures 1, 8B:
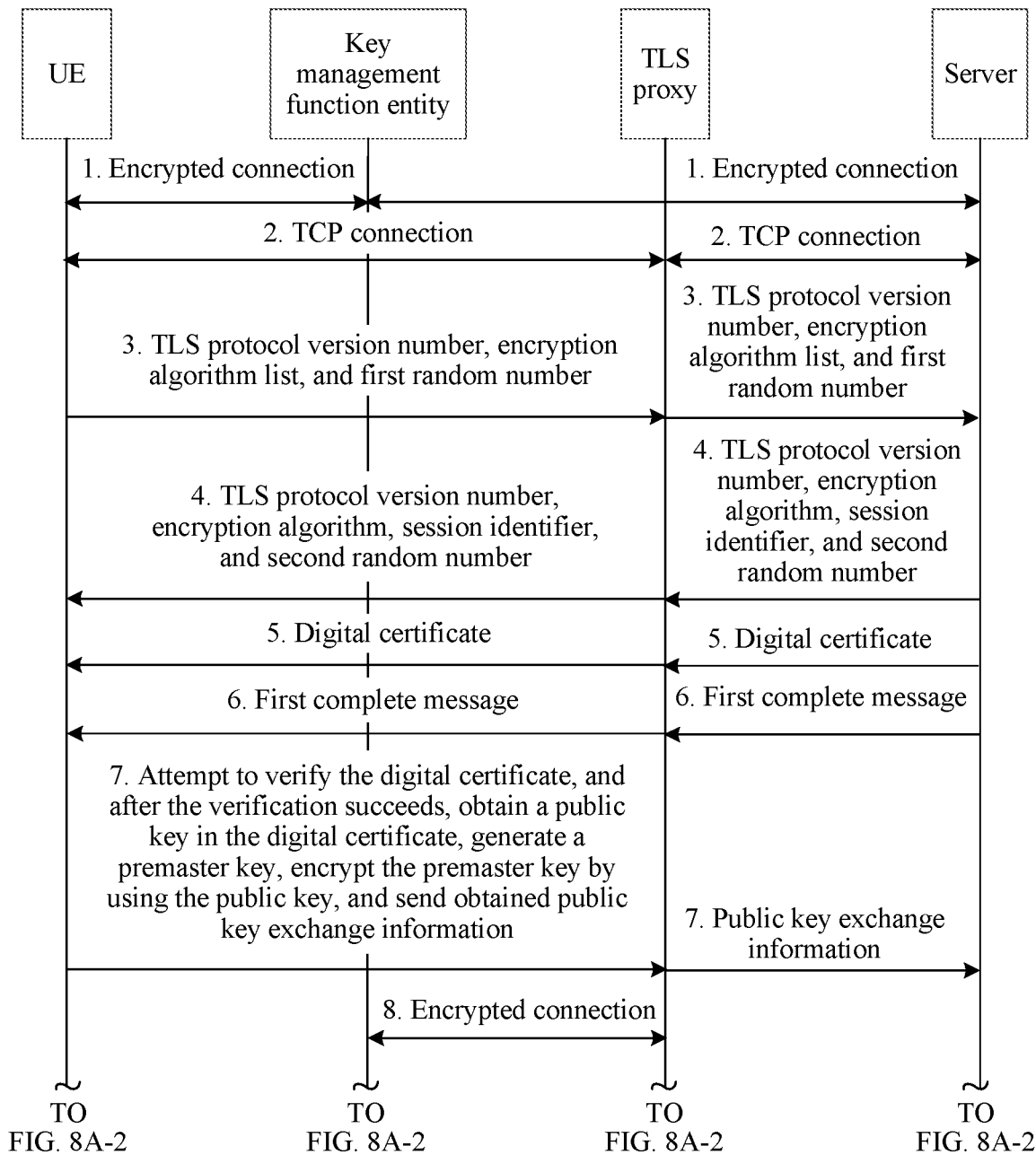
Figures 2, 8B:
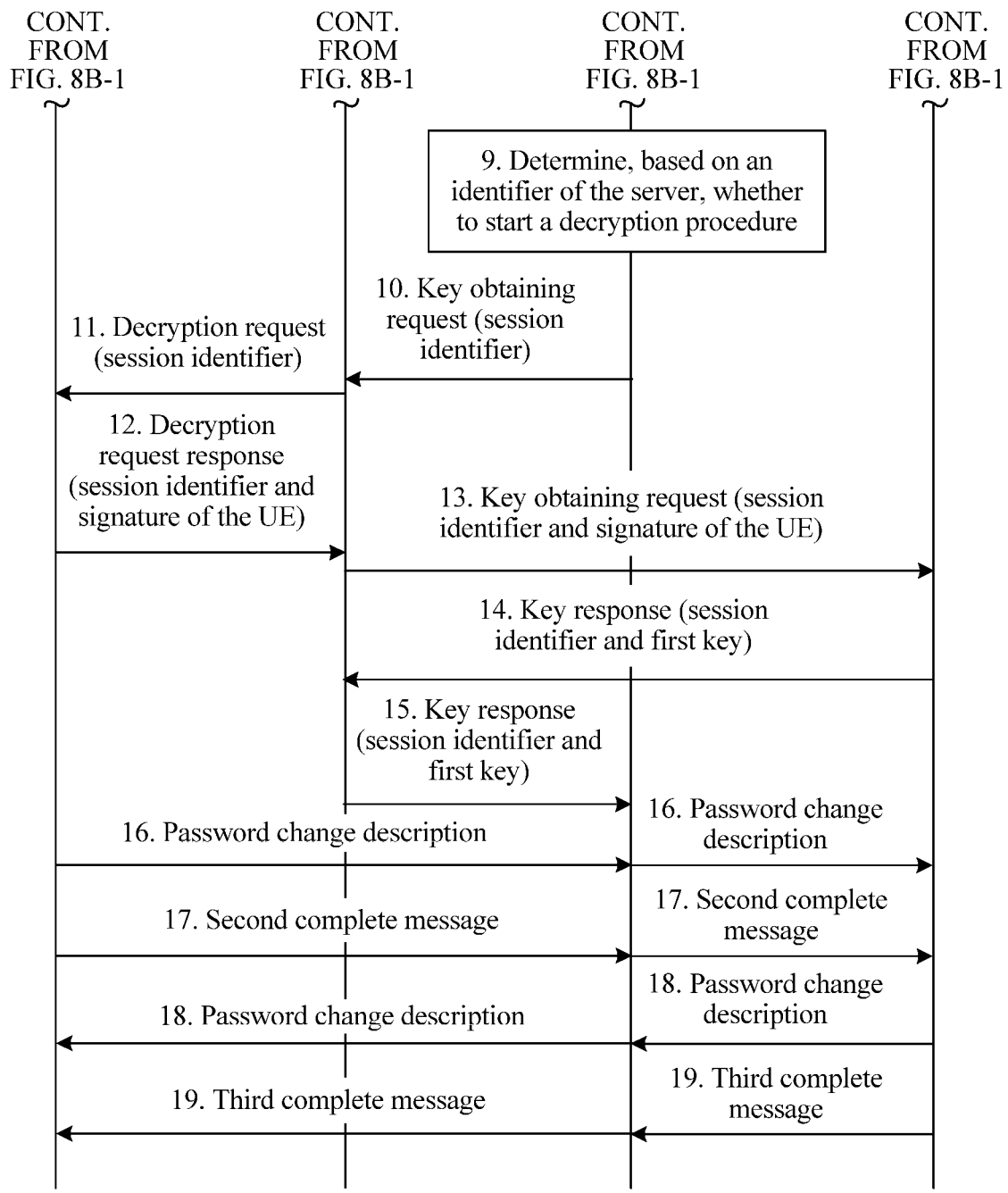

Referring to FIG. 8B-1 and FIG. 8B-2, for ease of understanding, in this embodiment, an implementation process of this embodiment is described by using an example in which the key management function entity is a key management function entity, the intermediary device is a TLS proxy, and the network server is a server.

1. The UE sets up an encrypted connection to the key management function entity, and the key management function entity sets up an encrypted connection to the server.

2. The UE sets up a TCP connection to the TLS proxy, and the TLS proxy sets up a TCP connection to the server.

Specifically, the TLS proxy intercepts a TCP setup request sent by the UE to the server, sets up, in place of the server, a TCP connection to the UE based on an IP address of the server, and sets up, in place of the UE, a TCP connection to the server based on an IP address of the UE.

3. The TLS proxy intercepts a TLS protocol version number, an encryption algorithm list, and a first random number that are sent by the UE to the server, and forwards the TLS protocol version number, the encryption algorithm list, and the first random number to the server.

4. If the server supports the TLS protocol version, the server selects an encryption algorithm from the encryption algorithm list, and sends the TLS protocol version number, the encryption algorithm, a session identifier, and a second random number to the UE. The TLS proxy intercepts the TLS protocol version number, the encryption algorithm, the session identifier, and the second random number sent by the server to the UE, and forwards the TLS protocol version number, the encryption algorithm, the session identifier, and the second random number to the UE.

5. The server sends a digital certificate to the UE, and the TLS proxy intercepts the digital certificate, and forwards the digital certificate to the UE.

6. The server sends a first complete message to the UE, and the TLS proxy intercepts the first complete message, and forwards the first complete message to the UE.

7. The UE attempts to verify the digital certificate, and after the verification succeeds, obtains a public key in the digital certificate, generates a premaster key, encrypts the premaster key by using the public key, and sends obtained public key exchange information to the server. The TLS proxy intercepts the public key exchange information, and forwards the public key exchange information to the server.

8. The TLS proxy sets up an encrypted connection to the key management function entity.

An execution sequence of operation 1, operation 8, and operations 2 to 7 is not limited in this embodiment.

9. The TLS proxy obtains an identifier of the server, determines, based on the identifier of the server, whether a decryption procedure needs to be started, and performs the next step when determining that the decryption procedure needs to be started.

10. The TLS proxy sends a key obtaining request carrying the session identifier to the key management function entity.

11. The key management function entity sends a decryption request carrying the session identifier to the UE.

12. The UE sends a decryption request response carrying the session identifier, a signature of the UE, and a digital certificate of the UE to the key management function entity.

13. The key management function entity sends a key obtaining request carrying the session identifier, a signature of the UE, and the digital certificate of the UE to the server.

14. After the server has verified the signature of the UE, the server sends a key response carrying the session identifier and a first key to the key management function entity.

15. The key management function entity sends the key response carrying the session identifier and the first key to the TLS proxy.

16. The UE sends a password change description to the server. The TLS proxy intercepts the password change description, and forwards the password change description to the server.

17. The UE sends a second complete message to the server. The TLS proxy intercepts the second complete message, and forwards the second complete message to the server.

18. The server sends a password change description to the UE. The TLS proxy intercepts the password change description, forwards the password change description to the UE, and instructs the UE to start negotiated parameters.

19. The server sends a third complete message to the UE. The TLS proxy intercepts the third complete message, and forwards the third complete message to the UE.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figures 1, 9A:
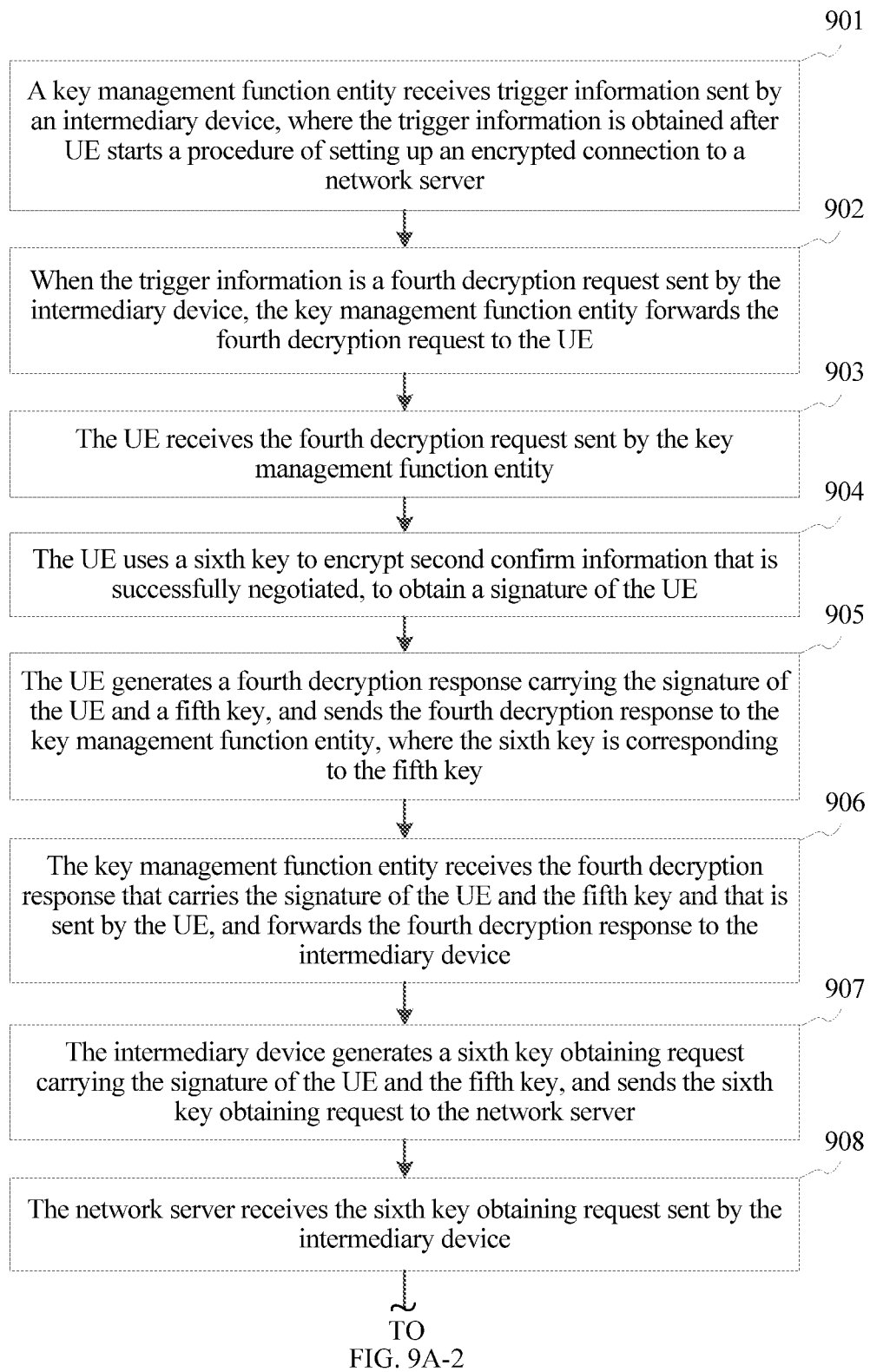
Figures 2, 9A:
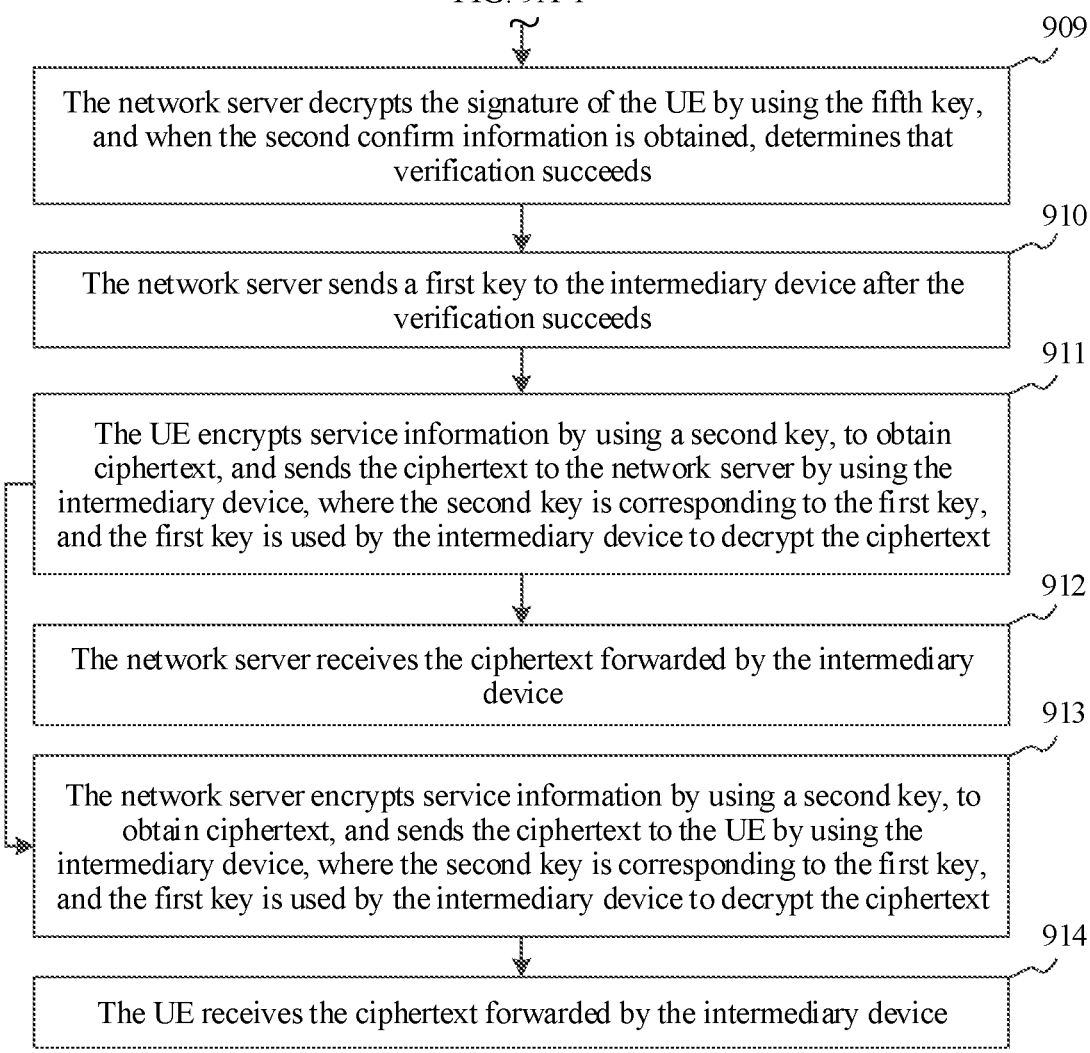

FIG. 9A-1 and FIG. 9A-2 are a method flowchart of a service processing method according to an embodiment of the present invention. The service processing method is applied to the second implementation scenario. A key management function entity negotiates with UE based on a request, and after the negotiation succeeds, triggers an intermediary device to obtain a first key from a network server. The service processing method may include the following operations.

Operation 901: The key management function entity receives trigger information sent by the intermediary device, where the trigger information is obtained after the UE starts a procedure of setting up an encrypted connection to the network server.

For details about operation 901, refer to the description of operation 601. The details are not described herein.

Operation 902: When the trigger information is a fourth decryption request sent by the intermediary device, the key management function entity forwards the fourth decryption request to the UE.

The fourth decryption request carries a session identifier.

Operation 903: The UE receives the fourth decryption request sent by the key management function entity.

Operation 904: The UE uses a sixth key to encrypt second confirm information that is successfully negotiated, to obtain a signature of the UE.

After determining, based on the session identifier, that the negotiation succeeds, the UE generates first confirm information, and encrypts the first confirm information by using the sixth key to obtain the signature of the UE. The sixth key may be a private key of the UE.

Operation 905: The UE generates a fourth decryption response carrying the signature of the UE and a fifth key, and sends the fourth decryption response to the key management function entity, where the sixth key is corresponding to the fifth key.

In addition to the signature of the UE, the fourth decryption response further needs to include the session identifier and the fifth key. When the sixth key is the private key of the UE, the fifth key may be a public key of the UE.

Optionally, because the fifth key is in a digital certificate of the UE, the fifth key in the fourth decryption response may be replaced with the digital certificate of the UE.

Operation 906: The key management function entity receives the fourth decryption response that carries the signature of the UE and the fifth key and that is sent by the UE, and forwards the fourth decryption response to the intermediary device.

Operation 907: The intermediary device generates a sixth key obtaining request carrying the signature of the UE and the fifth key, and sends the sixth key obtaining request to the network server.

Optionally, when the fourth decryption response includes the digital certificate of the UE, the fifth key in the sixth key obtaining request may be replaced with the digital certificate of the UE.

Operation 908: The network server receives the sixth key obtaining request sent by the intermediary device.

Operation 909: The network server decrypts the signature of the UE by using the fifth key, and when the second confirm information is obtained, determines that verification succeeds.

Operation 910: The network server sends the first key to the intermediary device after the verification succeeds.

Specifically, after the verification succeeds, the network server determines the first key based on the session identifier, generates a key response carrying the first key and the session identifier, and sends the key response to the intermediary device.

After obtaining the first key, the intermediary device obtains a second key based on the first key and uses the second key to decrypt ciphertext sent by the UE and the network server. Operations 911 and 912 are performed when the intermediary device uses the second key to decrypt ciphertext sent by the UE. For a specific implementation procedure, refer to the description of operations 611 and 612. Operations 913 and 914 are performed when the intermediary device uses the second key to decrypt ciphertext sent by the network server. For a specific implementation procedure, refer to the description of operations 613 and 614.

Operation 911: The UE encrypts service information by using a second key, to obtain ciphertext, and sends the ciphertext to the network server by using the intermediary device, where the second key is corresponding to the first key, and the first key is used by the intermediary device to decrypt the ciphertext.

Operation 912: The network server receives the ciphertext forwarded by the intermediary device.

Operation 913: The network server encrypts service information by using a second key, to obtain ciphertext, and sends the ciphertext to the UE by using the intermediary device, where the second key is corresponding to the first key, and the first key is used by the intermediary device to decrypt the ciphertext.

Operation 914: The UE receives the ciphertext forwarded by the intermediary device.

Figures 1, 9B:
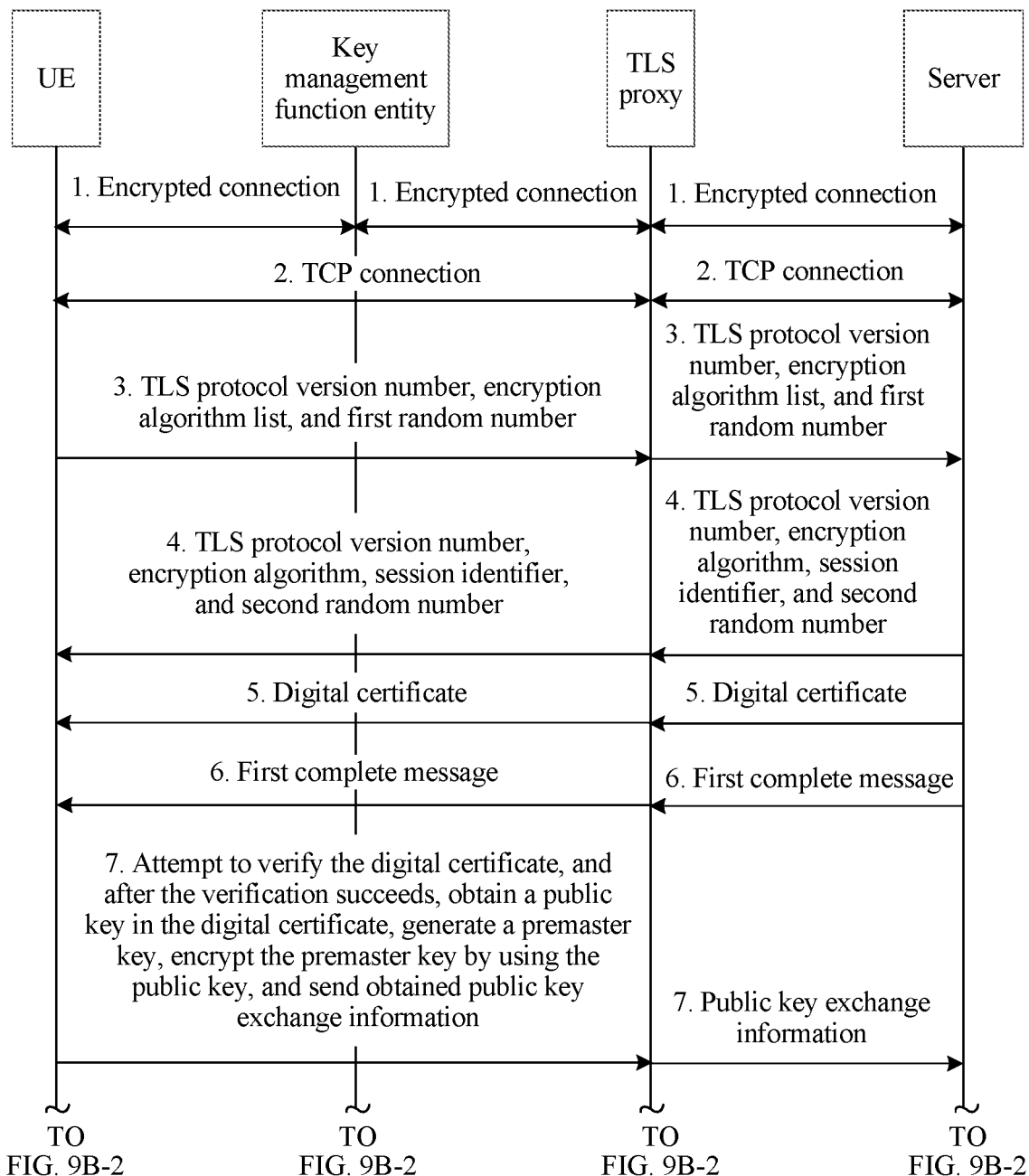
Figures 2, 9B:
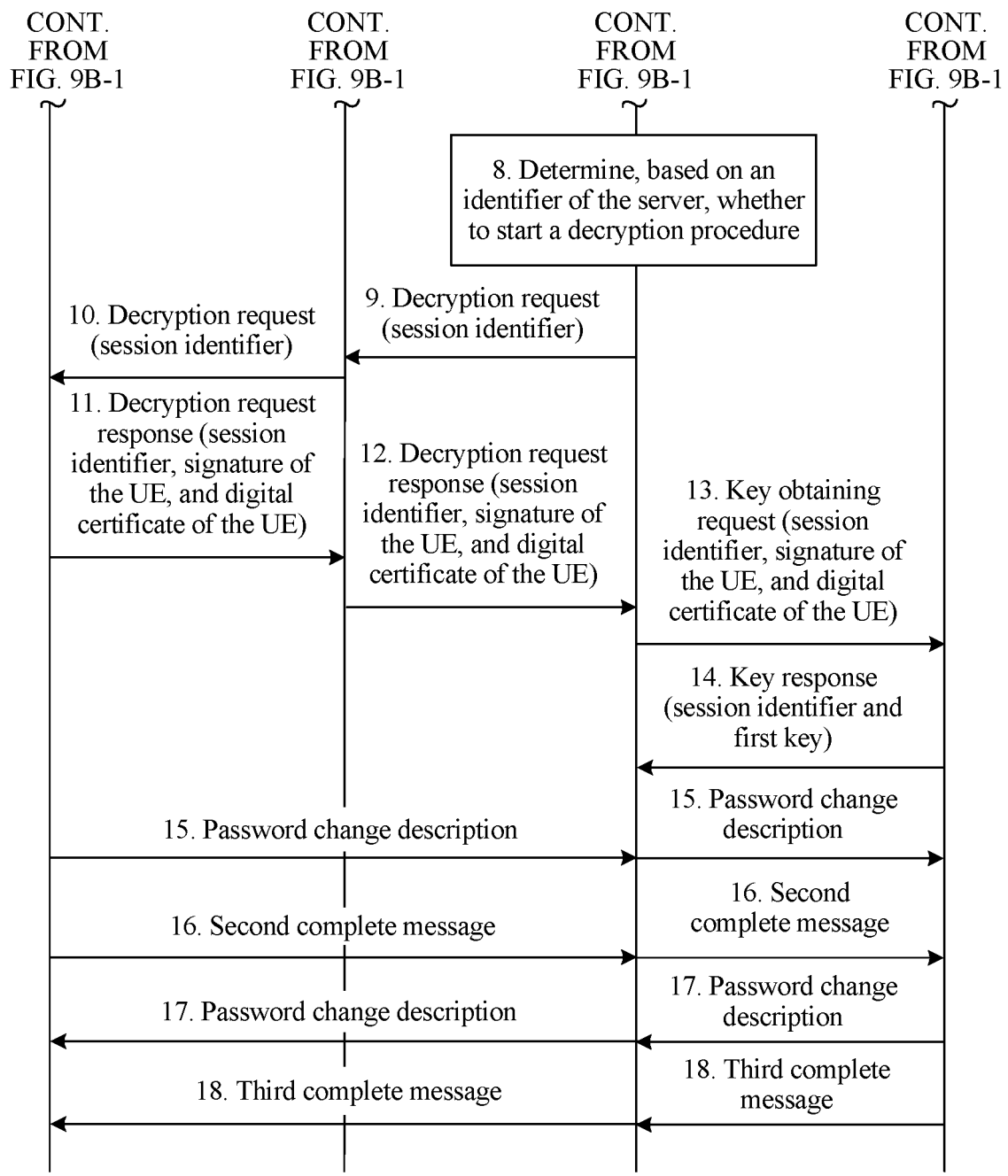

Referring to FIG. 9B-1 and FIG. 9B-2, for ease of understanding, in this embodiment, an implementation process of this embodiment is described by using an example in which the key management function entity is a key management function entity, the intermediary device is a TLS proxy, and the network server is a server.

1. The UE sets up an encrypted connection to the key management function entity, the key management function entity sets up an encrypted connection to the TLS proxy, and the TLS proxy sets up an encrypted connection to the server.

2. The UE sets up a TCP connection to the TLS proxy, and the TLS proxy sets up a TCP connection to the server.

Specifically, the TLS proxy intercepts a TCP setup request sent by the UE to the server, sets up, in place of the server, a TCP connection to the UE based on an IP address of the server, and sets up, in place of the UE, a TCP connection to the server based on an IP address of the UE.

3. The TLS proxy intercepts a TLS protocol version number, an encryption algorithm list, and a first random number that are sent by the UE to the server, and forwards the TLS protocol version number, the encryption algorithm list, and the first random number to the server.

4. If the server supports the TLS protocol version, the server selects an encryption algorithm from the encryption algorithm list, and sends the TLS protocol version number, the encryption algorithm, a session identifier, and a second random number to the UE. The TLS proxy intercepts the TLS protocol version number, the encryption algorithm, the session identifier, and the second random number sent by the server to the UE, and forwards the TLS protocol version number, the encryption algorithm, the session identifier, and the second random number to the UE.

5. The server sends a digital certificate to the UE, and the TLS proxy intercepts the digital certificate, and forwards the digital certificate to the UE.

6. The server sends a first complete message to the UE, and the TLS proxy intercepts the first complete message, and forwards the first complete message to the UE.

7. The UE attempts to verify the digital certificate, and after the verification succeeds, obtains a public key in the digital certificate, generates a premaster key, encrypts the premaster key by using the public key, and sends obtained public key exchange information to the server. The TLS proxy intercepts the public key exchange information, and forwards the public key exchange information to the server.

An execution sequence of operation 1 and operations 2 to 7 is not limited in this embodiment.

8. The TLS proxy obtains an identifier of the server, determines, based on the identifier of the server, whether a decryption procedure needs to be started, and performs the next step when determining that the decryption procedure needs to be started.

9. The TLS proxy sends a decryption request carrying the session identifier to the key management function entity.

10. The key management function entity sends the decryption request carrying the session identifier to the UE.

11. The UE sends a decryption request response carrying the session identifier, a signature of the UE, and a digital certificate of the UE to the key management function entity.

12. The key management function entity sends the decryption request response carrying the session identifier, the signature of the UE, and the digital certificate of the UE to the TLS proxy.

13. The TLS proxy sends a key obtaining request carrying the session identifier, the signature of the UE, and the digital certificate of the UE to the server.

14. The server sends a key response carrying the session identifier and the first key to the TLS proxy.

15. The UE sends a password change description to the server. The TLS proxy intercepts the password change description, and forwards the password change description to the server.

16. The UE sends a second complete message to the server. The TLS proxy intercepts the second complete message, and forwards the second complete message to the server.

17. The server sends a password change description to the UE. The TLS proxy intercepts the password change description, forwards the password change description to the UE, and instructs the UE to start negotiated parameters.

18. The server sends a third complete message to the UE. The TLS proxy intercepts the third complete message, and forwards the third complete message to the UE.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figure 10A:
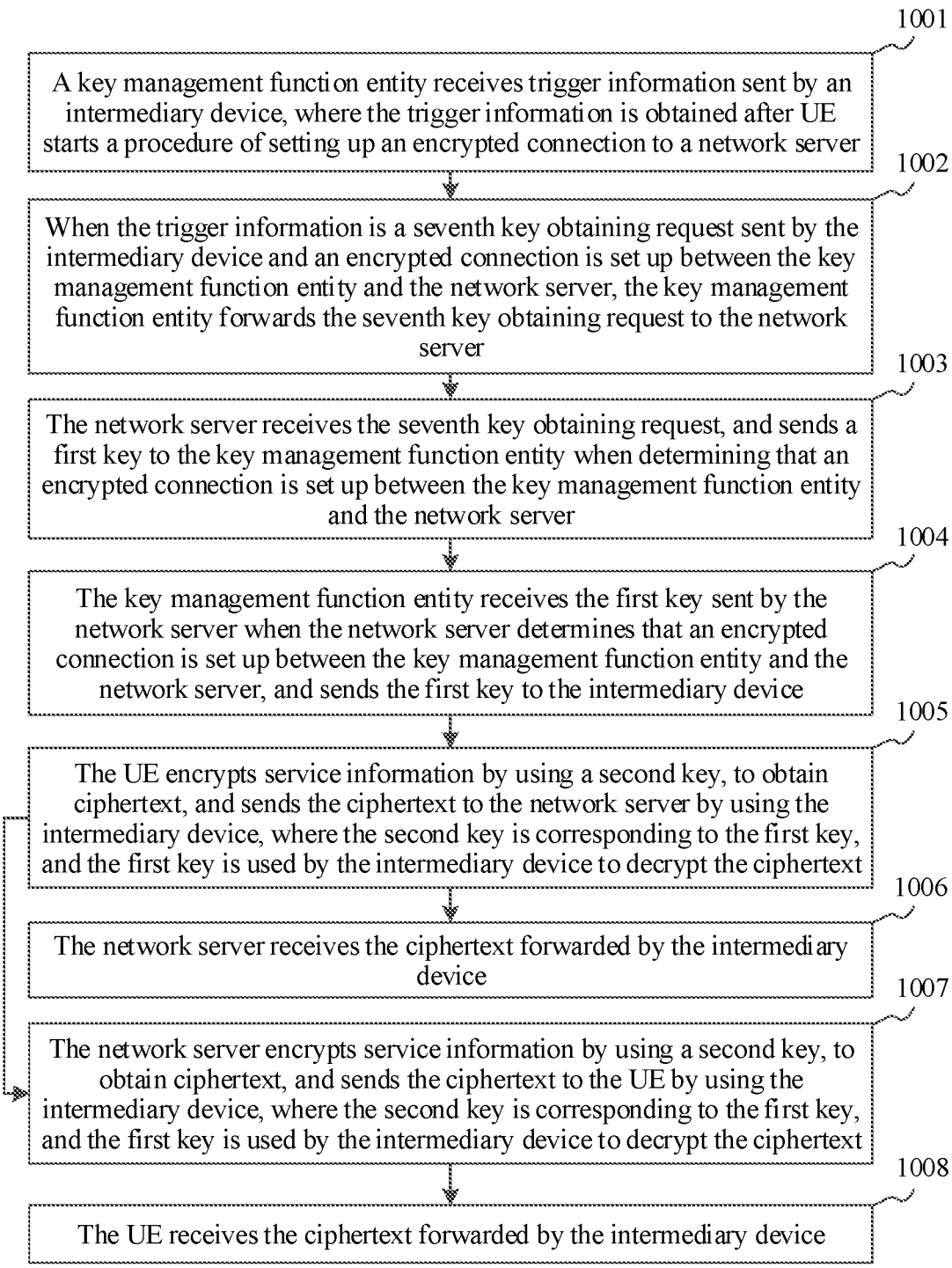
FIG. 10A is a method flowchart of a service processing method according to an embodiment of the present invention.

FIG. 10A is a method flowchart of a service processing method according to an embodiment of the present invention. The service processing method is applied to the third implementation scenario. An intermediary device is an edge server, and when an encrypted connection is set up between a key management function entity and a network server, the key management function entity obtains a first key from the network server based on a request, and sends the first key to the intermediary device. The service processing method may include the following operations.

Operation 1001: The key management function entity receives trigger information sent by the intermediary device.

For details about operation 1001, refer to the description of operation 601. The details are not described herein.

Operation 1002: When the trigger information is a seventh key obtaining request sent by the intermediary device and an encrypted connection is set up between the key management function entity and the network server, the key management function entity forwards the seventh key obtaining request to the network server.

When an encrypted connection is set up between the key management function entity and the network server, the key management function entity can obtain the first key from the network server without negotiating with the UE. Specifically, the key management function entity may forward, to the network server, the seventh key obtaining request sent by the intermediary device. The seventh key obtaining request carries a session identifier.

Operation 1003: The network server receives the seventh key obtaining request, and sends the first key to the key management function entity when determining that an encrypted connection is set up between the key management function entity and the network server.

The network server generates a key response carrying the first key and the session identifier, and sends the key response to the key management function entity.

Operation 1004: The key management function entity receives the first key sent by the network server when the network server determines that an encrypted connection is set up between the key management function entity and the network server, and sends the first key to the intermediary device.

The key management function entity may forward the received key response to the intermediary device, and the intermediary device obtains the first key from the key response.

After obtaining the first key, the intermediary device obtains a second key based on the first key and uses the second key to decrypt ciphertext sent by the UE and the network server. Operations 1005 and 1006 are performed when the intermediary device uses the second key to decrypt ciphertext sent by the UE. For a specific implementation procedure, refer to the description of operations 611 and 612. Operations 1007 and 1008 are performed when the intermediary device uses the second key to decrypt ciphertext sent by the network server. For a specific implementation procedure, refer to the description of operations 613 and 614.

Operation 1005: The UE encrypts service information by using a second key, to obtain ciphertext, and sends the ciphertext to the network server by using the intermediary device, where the second key is corresponding to the first key, and the first key is used by the intermediary device to decrypt the ciphertext.

Operation 1006: The network server receives the ciphertext forwarded by the intermediary device.

Operation 1007: The network server encrypts service information by using a second key, to obtain ciphertext, and sends the ciphertext to the UE by using the intermediary device, where the second key is corresponding to the first key, and the first key is used by the intermediary device to decrypt the ciphertext.

Operation 1008: The UE receives the ciphertext forwarded by the intermediary device.

Figures 1, 10B:
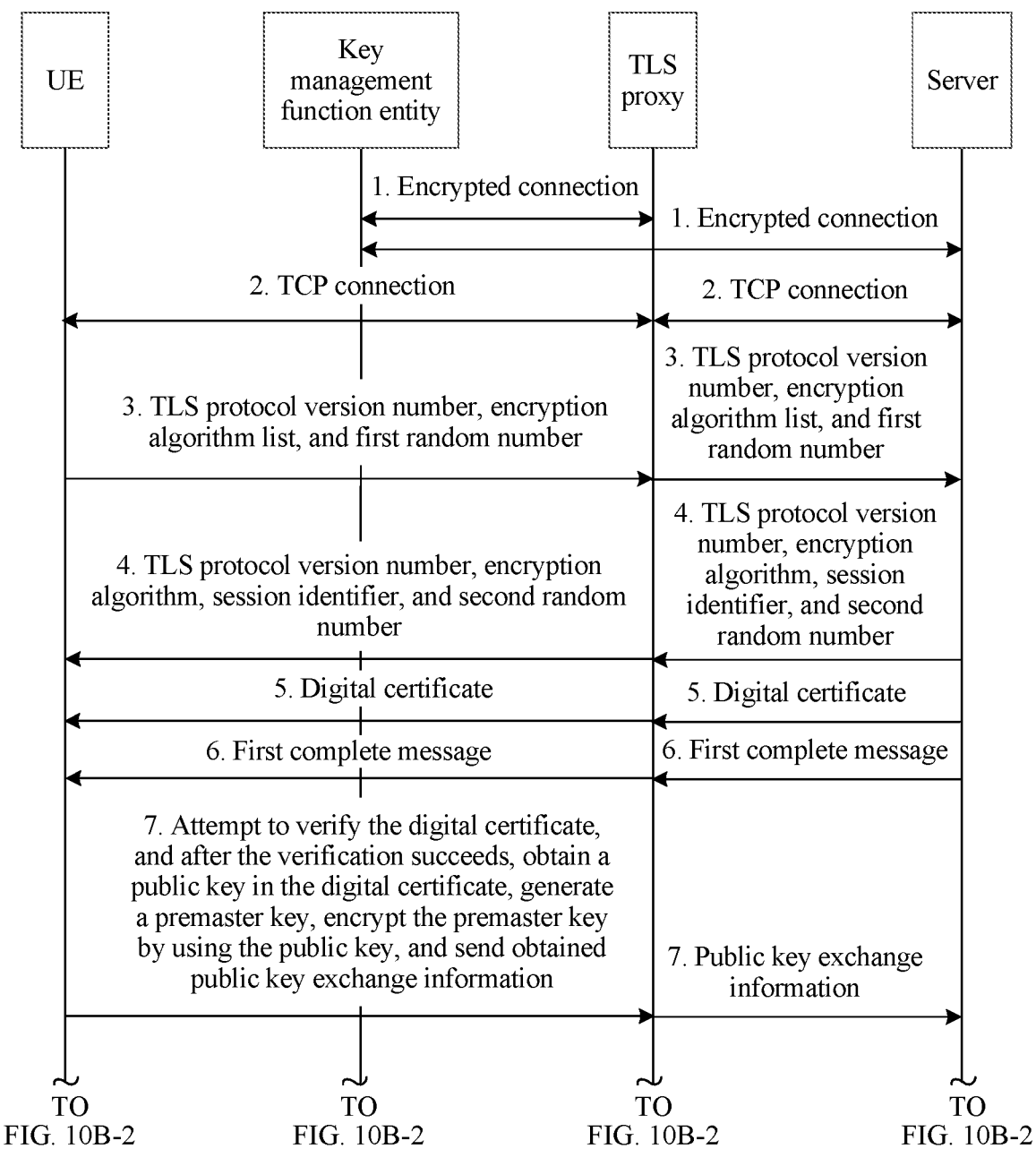
Figures 2, 10B:
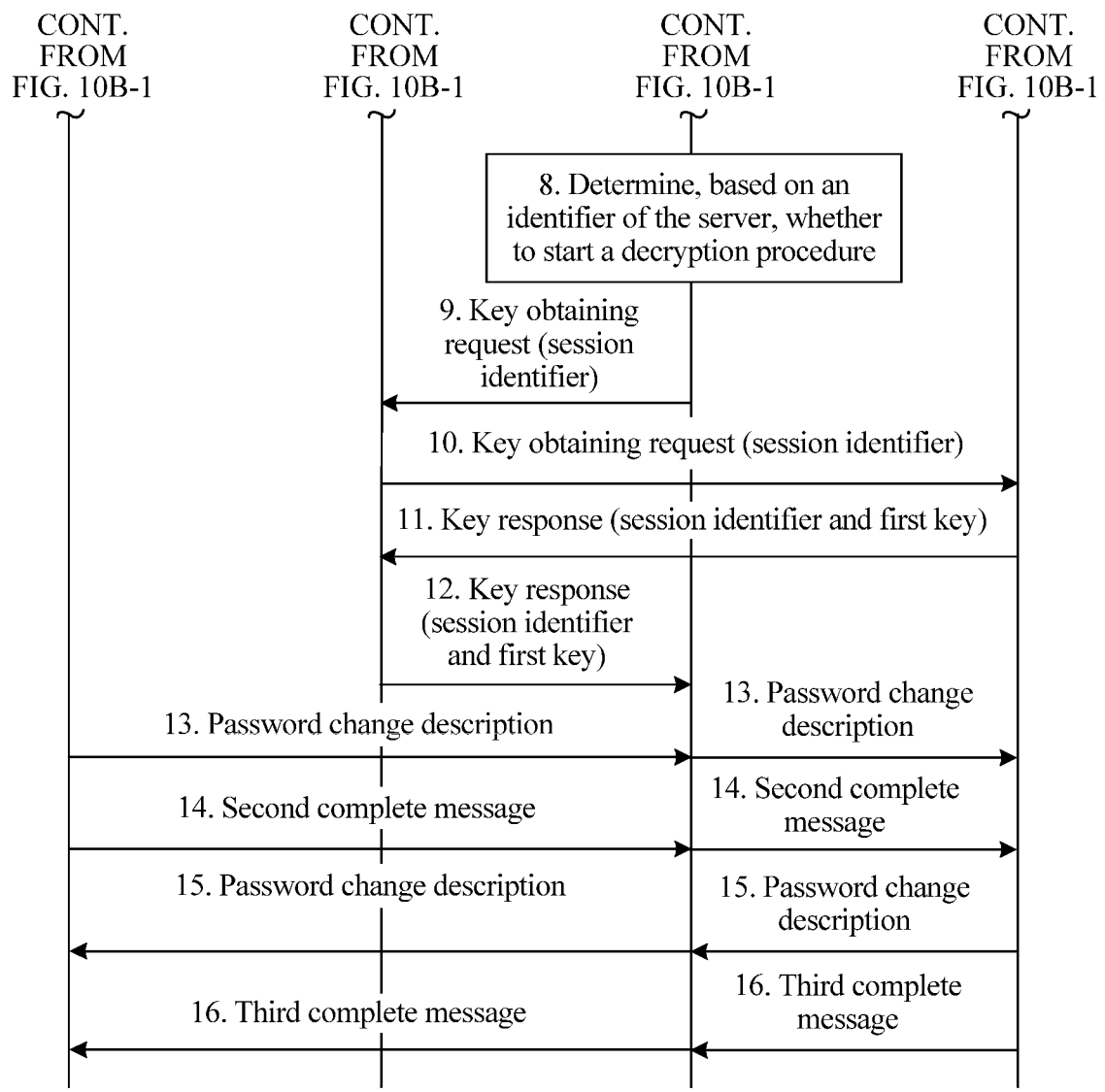

Referring to FIG. 10B-1 and FIG. 10B-2, for ease of understanding, in this embodiment, an implementation process of this embodiment is described by using an example in which the key management function entity is a key management function entity, the intermediary device is an edge server, and the network server is a server.

1. The key management function entity sets up an encrypted connection to the edge server, and the key management function entity sets up an encrypted connection to the server.

2. The UE sets up a TCP connection to the edge server, and the edge server sets up a TCP connection to the server.

Specifically, the edge server intercepts a TCP setup request sent by the UE to the server, sets up, in place of the server, a TCP connection to the UE based on an IP address of the server, and sets up, in place of the UE, a TCP connection to the server based on an IP address of the UE.

3. The edge server intercepts a TLS protocol version number, an encryption algorithm list, and a first random number that are sent by the UE to the server, and forwards the TLS protocol version number, the encryption algorithm list, and the first random number to the server.

4. If the server supports the TLS protocol version, the server selects an encryption algorithm from the encryption algorithm list, and sends the TLS protocol version number, the encryption algorithm, a session identifier, and a second random number to the UE. The edge server intercepts the TLS protocol version number, the encryption algorithm, the session identifier, and the second random number sent by the server to the UE, and forwards the TLS protocol version number, the encryption algorithm, the session identifier, and the second random number to the UE.

5. The server sends a digital certificate to the UE, and the edge server intercepts the digital certificate, and forwards the digital certificate to the UE.

6. The server sends a first complete message to the UE, and the edge server intercepts the first complete message, and forwards the first complete message to the UE.

7. The UE attempts to verify the digital certificate, and after the verification succeeds, obtains a public key in the digital certificate, generates a premaster key, encrypts the premaster key by using the public key, and sends obtained public key exchange information to the server. The edge server intercepts the public key exchange information, and forwards the public key exchange information to the server.

8. The edge server obtains an identifier of the server, determines, based on the identifier of the server, whether a decryption procedure needs to be started, and performs the next step when determining that the decryption procedure needs to be started.

9. The edge server sends a key obtaining request carrying the session identifier to the key management function entity.

10. The key management function entity sends the key obtaining request carrying the session identifier to the server.

11. The server sends a key response carrying the session identifier and a first key to the key management function entity.

12. The key management function entity sends the key response carrying the session identifier and the first key to the edge server.

13. The UE sends a password change description to the server. The edge server intercepts the password change description, and forwards the password change description to the server.

14. The UE sends a second complete message to the server. The edge server intercepts the second complete message, and forwards the second complete message to the server.

15. The server sends a password change description to the UE. The edge server intercepts the password change description, forwards the password change description to the UE, and instructs the UE to start negotiated parameters.

16. The server sends a third complete message to the UE. The edge server intercepts the third complete message, and forwards the third complete message to the UE.

In conclusion, according to the service processing method provided in this embodiment of the present invention, because data transmitted between the UE and the network server needs to be forwarded by the intermediary device, and the intermediary device is transparent to the UE, the UE needs to trigger, with the assistance of the key management function entity and the network server, the intermediary device to obtain the first key, so that the intermediary device uses the first key to decrypt the ciphertext transmitted between the UE and the network server, to provide service optimization. This resolves a problem that the intermediary device cannot provide service optimization for the user equipment because the intermediary device cannot decrypt ciphertext, and achieves an effect of expanding an application scope of service optimization.

Figure 11:
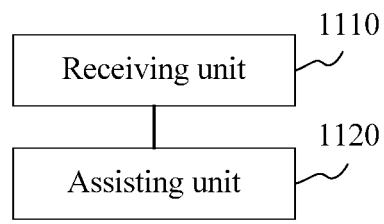
FIG. 11 is a schematic structural diagram of a service processing apparatus according to an embodiment of the present invention.

FIG. 11 is a schematic structural diagram of a service processing apparatus according to an embodiment of the present invention. The service processing apparatus may be implemented, by using hardware or a combination of hardware and software, as all or some of the foregoing key management function entity. The service processing apparatus may include:

a receiving unit 1110, configured to implement a function of operation 301 in the foregoing embodiment; and an assisting unit 1120, configured to implement a function of operation 302 in the foregoing embodiment.

It should be noted that the receiving unit 1110 may be implemented by using a transceiver in the key management function entity, and the assisting unit 1120 may be implemented by using a processor in the key management function entity.

Figure 12:
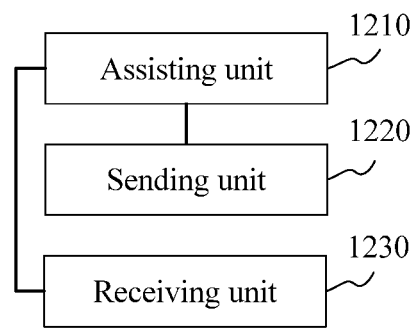
FIG. 12 is a schematic structural diagram of a service processing apparatus according to an embodiment of the present invention.

FIG. 12 is a schematic structural diagram of a service processing apparatus according to an embodiment of the present invention. The service processing apparatus may be implemented, by using hardware or a combination of hardware and software, as all or some of the foregoing UE. The service processing apparatus may include:

an assisting unit 1210, configured to implement a function of operation 401 in the foregoing embodiment;

a sending unit 1220, configured to implement a function of operation 402 in the foregoing embodiment; and a receiving unit 1230, configured to implement a function of operation 403 in the foregoing embodiment.

It should be noted that the assisting unit 1210 may be implemented by using a processor in the UE, and the sending unit 1220 and the receiving unit 1230 may be implemented by using a transceiver in the UE.

Figure 13:
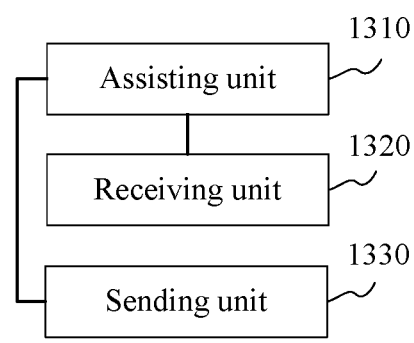
FIG. 13 is a schematic structural diagram of a service processing apparatus according to an embodiment of the present invention.

FIG. 13 is a schematic structural diagram of a service processing apparatus according to an embodiment of the present invention. The service processing apparatus may be implemented, by using hardware or a combination of hardware and software, as all or some of the foregoing network server. The service processing apparatus may include:

an assisting unit 1310, configured to implement a function of operation 501 in the foregoing embodiment;

a receiving unit 1320, configured to implement a function of operation 502 in the foregoing embodiment; and a sending unit 1330, configured to implement a function of operation 503 in the foregoing embodiment.

It should be noted that the assisting unit 1310 may be implemented by using a processor in the network server, and the receiving unit 1320 and the sending unit 1330 may be implemented by using a transceiver in the network server.

It should be noted that, when the service processing apparatus provided in the foregoing embodiment performs service processing, division of the foregoing functional modules is used only as an example for description. In an actual application, the foregoing functions may be allocated to different functional modules and implemented based on a requirement, that is, an internal structure of the service processing apparatus is divided into different functional modules for implementing all or some of the functions described above. In addition, the embodiments of the service processing apparatus and the service processing method provided in the foregoing embodiments belong to a same conception. For a specific implementation process thereof, refer to the method embodiment. Details are not described again herein.

The sequence numbers of the foregoing embodiments of the present invention are merely for illustrative purposes, and are not intended to indicate priorities of the embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service processing method, comprising:
receiving, by a key management function entity, trigger information, wherein the trigger information is obtained after user equipment (UE) starts a procedure of setting up a first encrypted connection to a network server;
assisting, by the key management function entity based on the trigger information, an intermediary device in negotiating with the UE and the network server, to enable the intermediary device to obtain a first key from the key management function entity through a second encrypted connection,
wherein the key management function entity obtains the first key from the UE through a third encrypted connection after a negotiation with the network server based on the trigger information succeeds, or obtains the first key from the network server through a fourth encrypted connection after a negotiation with the UE based on the trigger information succeeds, and sends the first key to the intermediary device, or
wherein the key management function entity triggers the intermediary device to obtain the first key from the network server after the negotiation with the UE based on the trigger information succeeds, or
wherein the key management function entity obtains the first key from the network server based on the trigger information when an encrypted connection is set up between the key management function entity and the network server, and sends the first key to the intermediary device,
wherein the first key is used by the intermediary device to decrypt ciphertext sent by the UE and the network server, the ciphertext is obtained after the UE or the network server encrypts service information using a second key, and the first key is corresponding to the second key.

2. The method according to claim 1, wherein the key management function entity obtains the first key from the UE after the negotiation with the network server succeeds, by performing the following operations:
when the trigger information is a first key obtaining request sent by the intermediary device,
sending, by the key management function entity, a first decryption request to the network server,
receiving a first decryption response that includes a signature of the network server and that is sent by the network server,
generating a second key obtaining request containing the signature of the network server,
sending the second key obtaining request to the UE,
receiving the first key sent by the UE after the UE has verified the signature of the network server using a third key, and
sending the first key to the intermediary device; or
when the trigger information is a third key obtaining request that includes a signature of the network server and that is sent by the intermediary device,
generating, by the key management function entity, a fourth key obtaining request containing the signature of the network server,
sending the fourth key obtaining request to the UE,
receiving the first key sent by the UE after the UE has verified the signature of the network server using a third key, and
sending the first key to the intermediary device, wherein the signature of the network server is obtained by the intermediary device from a second decryption response obtained after the intermediary device sends a second decryption request to the network server;
wherein the third key is obtained by the UE from the network server when the UE sets up the encrypted connection, the signature of the network server is obtained after the network server uses a fourth key to encrypt first confirm information that is successfully negotiated, and the fourth key corresponds to the third key.

3. The method according to claim 1, wherein the key management function entity, obtains the first key from the network server after the negotiation with the UE succeeds by performing the following operations:
when the trigger information is a fifth key obtaining request sent by the intermediary device,
sending, by the key management function entity, a third decryption request to the UE,
receiving a third decryption response that includes a signature of the UE and a fifth key and that is sent by the UE,
generating a fifth key obtaining request carrying the signature of the UE and the fifth key,
sending the fifth key obtaining request to the network server,
receiving the first key sent by the network server after the network server has verified the signature of the UE by using the fifth key, and
sending the first key to the intermediary device;
wherein signature information of the UE is obtained after the UE uses a sixth key to encrypt second confirm information that is successfully negotiated, and the sixth key corresponds to the fifth key.

4. The method according to claim 1, wherein the key management function entity triggers the intermediary device to obtain the first key from the network server by performing the following operations:
when the trigger information is a fourth decryption request sent by the intermediary device,
forwarding, by the key management function entity, the fourth decryption request to the UE,
receiving a fourth decryption response that includes a signature of the UE and a fifth key and that is sent by the UE, and
forwarding the fourth decryption response to the intermediary device, wherein the fourth decryption response is used to instruct the intermediary device to send a sixth key obtaining request carrying the signature of the UE and the fifth key to the network server, and to receive the first key sent by the network server after the network server has verified the signature of the UE by using the fifth key;
wherein signature information of the UE is obtained after the UE uses a sixth key to encrypt second confirm information that is successfully negotiated, and the sixth key is corresponding to the fifth key.

5. The method according to claim 1, wherein the key management function entity obtains the first key from the network server based on the trigger information when an encrypted connection is set up between the key management function entity and the network server by performing the following operations:
  when the trigger information is a seventh key obtaining request sent by the intermediary device and an encrypted connection is set up between the key management function entity and the network server,
  forwarding, by the key management function entity, the seventh key obtaining request to the network server,
  receiving the first key that is sent by the network server when the network server determines that an encrypted connection is set up between the key management function entity and the network server, and
  sending the first key to the intermediary device.

6. A service processing apparatus, applied to a key management function entity, the apparatus comprising:
  one or more processors;
  a memory storing instructions, which, when executed by the one or more processors, cause the one or more processors to perform operations comprising:
  receiving trigger information sent by an intermediary device, wherein the trigger information is obtained after user equipment (UE) starts a procedure of setting up a first encrypted connection to a network server; and
    assisting, based on the trigger information received by the transceiver, the intermediary device in negotiating with the UE and the network server, to enable the intermediary device to obtain a first key from the key management function entity through a second encrypted connection,
    wherein the key management function entity obtains the first key from the UE through a third encrypted connection after a negotiation with the network server based on the trigger information succeeds, or obtains the first key from the network server through a fourth encrypted connection after a negotiation with the UE based on the trigger information succeeds, and sends the first key to the intermediary device, or
    wherein the key management function entity triggers the intermediary device to obtain the first key from the network server after the negotiation with the UE based on the trigger information succeeds, or
    wherein the key management function entity obtains the first key from the network server based on the trigger information when an encrypted connection is set up between the key management function entity and the network server, and sends the first key to the intermediary device,
    wherein the key management function entity obtains the first key from the UE through a third encrypted connection or from the network server through a fourth encrypted connection, wherein the first key is used by the intermediary device to decrypt ciphertexts sent by the UE and the network server, the ciphertext is obtained after the UE or the network server encrypts service information by using a second key, and the first key is corresponding to the second key.

7. The apparatus according to claim 6, to the operations further comprising:
  when the trigger information is a first key obtaining request sent by the intermediary device,
  sending a first decryption request to the network server,
  receiving a first decryption response that includes a signature of the network server and that is sent by the network server,
  generating a second key obtaining request carrying the signature of the network server,
  sending the second key obtaining request to the UE,
  receiving the first key sent by the UE after the UE has verified the signature of the network server by using a third key, and
  sending the first key to the intermediary device; or
  when the trigger information is a third key obtaining request that includes a signature of the network server and that is sent by the intermediary device,
  generating a fourth key obtaining request containing the signature of the network server,
  sending the fourth key obtaining request to the UE,
  receiving the first key sent by the UE after the UE has verified the signature of the network server by using a third key, and
  sending the first key to the intermediary device, wherein the signature of the network server is obtained by the intermediary device from a second decryption response obtained after the intermediary device sends a second decryption request to the network server;
  wherein the third key is obtained by the UE from the network server when the UE sets up the encrypted connection, the signature of the network server is obtained after the network server uses a fourth key to encrypt first confirm information that is successfully negotiated, and the fourth key is corresponding to the third key.

8. The apparatus according to claim 6, the operations further comprising:
  when the trigger information is a fifth key obtaining request sent by the intermediary device,
  sending a third decryption request to the UE,
  receiving a third decryption response that carries a signature of the UE and a fifth key and that is sent by the UE,
  generating a fifth key obtaining request containing the signature of the UE and the fifth key,
  sending the fifth key obtaining request to the network server,
  receiving the first key sent by the network server after the network server has verified the signature of the UE by using the fifth key, and
  sending the first key to the intermediary device;
  wherein signature information of the UE is obtained after the UE uses a sixth key to encrypt second confirm information that is successfully negotiated, and the sixth key is corresponding to the fifth key.

9. The apparatus according to claim 6, the operations further comprising:
  when the trigger information is a fourth decryption request sent by the intermediary device,
  forwarding the fourth decryption request to the UE,
  receiving a fourth decryption response that carries a signature of the UE and a fifth key and that is sent by the UE, and
  forwarding the fourth decryption response to the intermediary device, wherein the fourth decryption response is used to instruct the intermediary device to send a sixth key obtaining request containing the signature of the UE and the fifth key to the network server, and to receive the first key sent by the network server after the network server has verified the signature of the UE by using the fifth key;
  wherein signature information of the UE is obtained after the UE uses a sixth key to encrypt second confirm information that is successfully negotiated, and the sixth key is corresponding to the fifth key.

10. The apparatus according to claim 6, the operations further comprising:
when the trigger information is a seventh key obtaining request sent by the intermediary device and an encrypted connection is set up between the key management function entity and the network server,
forwarding the seventh key obtaining request to the network server,
receiving the first key that is sent by the network server when the network server determines that an encrypted connection is set up between the key management function entity and the network server, and
sending the first key to the intermediary device.

11. A service processing apparatus, applied to user equipment (UE), comprising:
one or more processors;
a memory storing instructions, which, when executed by the one or more processors, cause the one or more processors to perform operations comprising: assisting, with an by a key management function entity and a network server, an intermediary device in obtaining a first key from the key management function entity through a first encrypted connection,
wherein the key management function entity obtains the first key from the UE through a second encrypted connection after a negotiation with the network server based on the trigger information succeeds, or obtains the first key from the network server through a third encrypted connection after a negotiation with the UE based on the trigger information succeeds, and sends the first key to the intermediary device, or
wherein the key management function entity triggers the intermediary device to obtain the first key from the network server after the negotiation with the UE based on the trigger information succeeds, or
wherein the key management function entity obtains the first key from the network server based on the trigger information when an encrypted connection is set up between the key management function entity and the network server, and sends the first key to the intermediary device;
encrypting service information using a second key, to obtain ciphertext; and
sending the ciphertext to the network server by using the intermediary device; or receiving ciphertext forwarded by the intermediary device, wherein the ciphertext is obtained after the network server encrypts service information by using a second key and is sent by the network server to the intermediary device;
wherein the first key is used by the intermediary device to decrypt the ciphertext, and the first key corresponds to the second key.

12. The apparatus according to claim 11, the operations further comprising:
receiving a key obtaining request sent by the key management function entity, wherein the key obtaining request includes a signature of the network server, and the signature of the server is obtained after the network server uses a fourth key to encrypt first confirm information that is successfully negotiated;
decrypting the signature of the network server using a third key, and determine that verification succeeds when obtaining the first confirm information, wherein the third key is obtained by the UE from the network server when the UE sets up the encrypted connection, and the third key corresponds to the fourth key; and
sending the first key to the key management function entity after the verification succeeds, wherein the first key is sent by the key management function entity to the intermediary device.

13. The apparatus according to claim 11, the operations further comprising:
receiving a decryption request sent by the key management function entity;
encrypting, by using a sixth key, second confirm information that is successfully negotiated, to obtain a signature of the UE; and
generating a decryption response carrying the signature of the UE and a fifth key, and send the decryption response to the key management function entity, wherein the key management function entity is configured to send the decryption response to the intermediary device, and
wherein the intermediary device is configured to
generate a key obtaining request containing the signature of the UE and the fifth key,
send the key obtaining request to the network server, and
receive the first key sent by the network server after the network server has verified the signature of the UE using the fifth key; or
wherein the key management function entity is configured to
generate a key obtaining request containing the signature of the UE and the fifth key,
send the key obtaining request to the network server,
obtain the first key sent by the network server after the network server has verified the signature of the UE by using the fifth key, and
send the first key to the intermediary device; wherein the fifth key corresponds to the sixth key.

* * * * *